United States Patent
Giri

(10) Patent No.: US 12,459,900 B2
(45) Date of Patent: Nov. 4, 2025

(54) COMPOUNDS FOR TREATING CONDITIONS RELATED TO OXIDATIVE STRESS

(71) Applicant: Rajan Shobhanath Giri, Naperville, IL (US)

(72) Inventor: Rajan Shobhanath Giri, Naperville, IL (US)

( * ) Notice: Subject to any disclaimer, the term of this patent is extended or adjusted under 35 U.S.C. 154(b) by 246 days.

(21) Appl. No.: 17/802,239

(22) PCT Filed: Mar. 10, 2022

(86) PCT No.: PCT/US2022/019657
§ 371 (c)(1),
(2) Date: Aug. 25, 2022

(87) PCT Pub. No.: WO2022/192477
PCT Pub. Date: Sep. 15, 2022

(65) Prior Publication Data
US 2024/0262794 A1     Aug. 8, 2024

Related U.S. Application Data

(60) Provisional application No. 63/159,081, filed on Mar. 10, 2021.

(51) Int. Cl.
*C07D 231/08*     (2006.01)
*A61K 9/00*       (2006.01)
(Continued)

(52) U.S. Cl.
CPC .......... *C07D 231/08* (2013.01); *A61K 9/0048* (2013.01); *A61K 9/08* (2013.01);
(Continued)

(58) Field of Classification Search
CPC ................ C07D 231/08; C07D 405/12; A61K 31/4152; A61P 27/02
See application file for complete search history.

(56) References Cited

U.S. PATENT DOCUMENTS

| | | |
|---|---|---|
| 2005/0250047 A1 | 11/2005 | Morton et al. |
| 2020/0297697 A1 | 9/2020 | Wang |

FOREIGN PATENT DOCUMENTS

WO     WO 2019/21333 A1     11/2019

OTHER PUBLICATIONS

Parihar et. al., Jun. 5, 2014, "Pyrazolone as a recognition site: Rhodamine G6-Based Fluorescent Probe for . . . Solution." Luminescenes. vol. 30, p. 168-174; p. 169 Scheme 1.
(Continued)

*Primary Examiner* — Kamal A Saeed
(74) *Attorney, Agent, or Firm* — IP Pundit LLC

(57) ABSTRACT

Disclosed herein are compounds for treating conditions related to oxidative stress/damage among other causes, with pharmaceutically accepted salts hydrate, solvate, optical isomer, or combination thereof, comprising lipophilic cation moieties linked to heterocyclics compounds of formula (I) and formula (8);

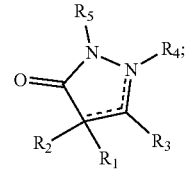

(Formula I)

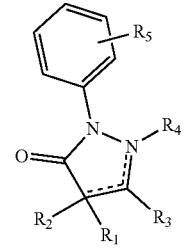

(Formula 8)

wherein $R_1$, $R_2$, $R_3$, $R_4$, and $R_5$ may be selected from the group consisting of

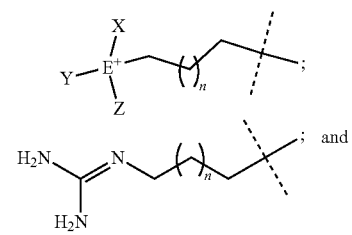

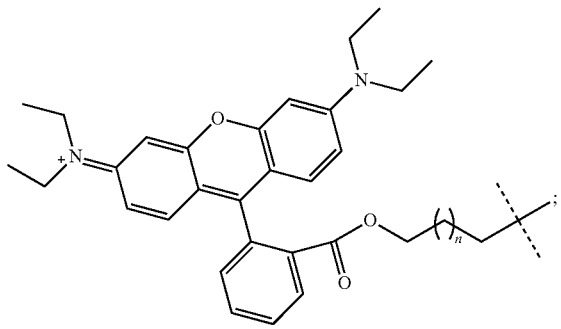

wherein X, Y, and Z are selected from the group consisting of —H, methyl, ethyl, propyl, butyl, substituted or unsubstituted aryl, and heteroaryls; n is an integer selected from 0-18, and E is a phosphorous or nitrogen atom.

15 Claims, 3 Drawing Sheets

(51) Int. Cl.
    *A61K 9/08*     (2006.01)
    *A61K 31/4152*     (2006.01)
    *A61K 31/675*     (2006.01)
    *A61P 27/02*     (2006.01)
    *C07D 405/12*     (2006.01)
    *C07F 9/6503*     (2006.01)

(52) U.S. Cl.
    CPC ........ *A61K 31/4152* (2013.01); *A61K 31/675* (2013.01); *A61P 27/02* (2018.01); *C07D 405/12* (2013.01); *C07F 9/65031* (2013.01)

(56) References Cited

OTHER PUBLICATIONS

Marchetti et. al., Dec. 15, 2019, "Coordination Chemistry of Pryazolone-based Ligands and Applications" Coordindation Chemestry Reviews. vol. 401 p. 1-77, p. 8 Chart 9.
Written Opinion of the International Search Report dated Jun. 3, 2022.
International Search Report dated Jun. 3, 2022.
Search Strategy dated Jun. 3, 2022 in the file history of the corresponding international application.

COMPOUNDS FOR TREATING CONDITIONS RELATED TO OXIDATIVE STRESS

CROSS REFERENCE TO RELATED APPLICATIONS

This application is a U.S. National Stage application of International Patent Application Number PCT/US22/19657, filed on Mar. 10, 2022, which claims the benefit of priority of U.S. Provisional Application No. 63/159,081, filed Mar. 10, 2021, which is hereby incorporated by reference in its entirety.

TECHNICAL FIELD

The present disclosure relates to compounds comprising one or more quaternary cationic moieties chemically linked to one or more antioxidant moieties for treating conditions involving oxidative stress in mammals.

BACKGROUND

Oxidative stress contributes to a number of human diseases associated with ageing, such as Parkinson's disease, and Alzheimer's disease, as well as to Huntington's Chorea, diabetes and Friedreich's Ataxia, and to non-specific damage that accumulates with aging. It also contributes to inflammation and ischaemic-reperfusion tissue injury in stroke and heart attack, and during organ transplantation and surgery. To prevent the damage caused by oxidative stress several antioxidant therapies have been developed. However, most of these are not targeted within cells and are therefore less than optimally effective.

Mitochondria are the intracellular organelles primarily responsible for energy metabolism. They are also the major source of the free radicals and reactive oxygen species (ROS) that cause oxidative stress and/or damage inside most cells. Mitochondria are equipped to detoxify ROS due to the presence of antioxidant enzymes (peroxiredoxins, thioredoxins, and GSH-dependent peroxidases). Typically, mitochondrial Superoxide (the radical anion produced by one electron reduction of O) is dismutated by manganese superoxide dismutase (MnSOD) that is localized within the mitochondrial matrix. However, when cellular ROS production exceeds the cell's detoxification capacity, oxidative damage occurs. This damage disrupts mitochondrial function and oxidative phosphorylation and leads to significant cellular damage to mitochondrial, cytoplasmic or nuclear cellular proteins, DNA, RNA, and phospholipids, and thus induces cell damage, death and/or disease. Superoxide can also react with nitric oxide at a diffusion-controlled reaction rate, forming a highly potent oxidant and peroxynitrite that can modify proteins and DNA through oxidation and nitration reactions. In addition to these damaging and pathological roles, ROS also act as a redox signaling molecule(s) and promotes cell proliferation, DNA damage repair errors and mutation leading to inflammatory hyperproliferation, neoplasia, and malignancy As such, mitochondria are recognized as one of the most important targets for new drug design in various therapeutic areas, including cancer, inflammation, ocular, cardiovascular, and neurological diseases. The most effective way to deliver drugs specifically to mitochondria is by covalently linking a lipophilic cation such as an alkyltriphenylphosphonium moiety to a pharmacophore of interest. Other delocalized lipophilic cations, such as rhodamine, natural and synthetic mitochondria-targeting peptides, and nanoparticle vehicles, have also been used for mitochondrial delivery of small molecules. Such ions are accumulated provided they are sufficiently lipophilic to screen the positive charge or delocalise it over a large surface area, also provided that there is no active efflux pathway, and the cation is not metabolised or immediately toxic to a cell.

Oxidative damage also plays a key role in the aging process. In addition, oxidative damage has a role in the etiology of hypoxic damage, cancer, and cardiovascular diseases associated with reperfusion, and neurodegenerative disorders (Parkinson's disease, Alzheimer's disease, amyotrophic lateral sclerosis). Oxidative stress also contributes diseases like Huntington's Chorea, diabetes, and Friedreich's Ataxia, and to non-specific damage that accumulates with aging. It also contributes to inflammation and ischemic-reperfusion tissue injury in stroke and heart attack, and during organ transplantation and Surgery.

In the field ophthalmology, oxidative stress is involved in the pathogenesis of several eye diseases, such as senile cataract, age-related macular degeneration, uveitis, premature retinopathy, keratitis and ocular inflammation. It has been reported that oxidized protein levels are increased in accordance with the elevated inflammatory activity during these diseases. Oxidative stress plays major role in pathogenesis of several forms of dry eyes and therapeutic modalities employing topical/systemic use of antioxidants may be useful.

The eyes require a rich oxygen and nutrient supply, and this high-energy demand of the visual system makes it sensitive to oxidative stress. Retinal cells are vulnerable to ROS due to their coordinated interaction and intricate neural networks. Excessive free radicals result in mitochondrial dysfunction and lead to retinal neurodegeneration, as an early stage of retinal metabolic disorders. Retinal neurodegeneration is one of the major causes of visual impairment and is highly associated with atrophy or cell death of the retina in ocular diseases, such as glaucoma, age-related macular degeneration (AMD), and diabetic retinopathy (DR). Metabolic changes drive both AMD and DR and ROS induced damage is central to both of these conditions. Free radical scavenging agents have shown neuroprotective effects and are known to promote mitochondrial gene expression, which can lead to improved organization of retinal cells and visual function. SS-31 is a synthetic tetra peptide which targets inner mitochondrial membrane and known to reduce the mitochondrial ROS is found to be effective in reversing visual decline in a streptozotocin-induced mouse model of diabetes. Similarly, various other antioxidant therapy has been developed and found to be efficacious for treating damages caused by oxidative stress. However, most of these are not targeted within cells and are therefore less than optimally effective.

Hence, unregulated mitochondrial ROS production, the resulting oxidative cellular damage-induced diseases and abnormalities represent unsolved problems in the art and present a compelling target for pharmacological drug interventions with pharmaceutical antioxidant small molecule drug formulations. To prevent the cellular damage caused by oxidative stress several prior arts antioxidant therapies have been developed for treating various diseases resulting from oxidative stress. However, most of those inventions are not targeted to other organelles within cells or to the mitochondria and are therefore less than optimally effective.

Mitochondria-targeting technologies pioneered by murphy et al has garnered a lot of interest recently and there have been few successes surrounding it which validate the implication of this concept. As per this concept "warhead' groups are covalently coupled via linker groups to a bulky and/or lipophilic cationic moiety such as a quaternary ammonium or phosphonium cationic moiety. These compounds are initially absorbed and accumulate in the cytoplasmic region of cells in response to the negative plasma membrane potential of 30-60 mV. Additionally, within a few minutes after drug treatment, the lipophilic cations with a positive 30-60 mV potential permeate through the mitochondrion's lipid layers and selectively accumulate within mitochondria due to the larger mitochondrial membrane potential of 150-170 mV (negative inside).

Depending on the approach used, and the cell and mitochondrial membrane potentials, more than 1000-fold higher mitochondrial concentration can be achieved. Mitochondrial targeting has been developed to study mitochondrial physiology and dysfunction and the interaction between mitochondria and other subcellular organelles and for treatment of a variety of diseases. Various publications have also discussed the efforts to target small-molecule compounds to mitochondria for probing mitochondria function, as diagnostic tools and potential therapeutics all of which are herein incorporated by reference in their entirety.

Five membered heterocyclic molecules among others have been reported to show potent free radical scavenging as well as antioxidant properties in various preclinical and clinical studies. They have effectively utilized in many fields specially in pharmaceuticals, since they exhibit bioactivity as an analgesic, retinal diseases, antibacterial, anti-inflammatory, antioxidant, antipsychotic and antitumoral. Though in some instances like in case of Edaravone (EDA) the biologic activity is postulated to be due to transfer of electron from the anion at physiological pH. The EDA radical intermediate produced during this process is hypothesized to be of lower reactivity than that of oxygen free radicals described below. Though their ROS neutralization potential as well as their contribution to the therapeutic effect cannot be ruled out. Various other modification of Edaravone have been reported like introduction of C18 hydrocarbon chain on C-4 position to increases the affinity towards lipid membrane and derivative of Edaravone devoid of pyridoxal trapping capacity which was found to inhibit advanced glycation along with oxidative stress. EDA has also been reported to be useful in specific side effect of chemo, radio and immuno-therapy of cancer. This cytoprotective effect of EDA can also be exploited in treating or preventing conditions like myocardial, retinal, lung, intestinal, liver pancreatic and renal injury, all of which are herein incorporated by reference in their entirety. Mitochondria-targeted compounds in this class of agents are shown below and include a mitochondria-directed ubiquinone (Mito Q) reported by Murphy and coworkers (U.S. Pat. Nos. 6,331, 532 and 7,232,809, and EP Patent 1047701 B1, all of which are herein incorporated by reference in their entirety. MitoQ has shown promise in the treatment of only some, but not all, oxidative stress induced diseases. MitoQ is currently undergoing Phase II clinical trials for the treatment of Parkinson's disease, but it has relatively minor activity against other oxidative stress-induced neurodegenerative diseases such as Amyotrophic Lateral Sclerosis (ALS or Lou Gehrig's Disease). This class of compounds is also disclosed in U.S. Published Application No. U.S. 2008/0032940, herein incorporated by reference in its entirety.

Other classes of mitochondria-targeted compounds include mitochondria-targeted nitroxides, which have been used in method for treating neurodegenerative disorders (see U.S. Published Application No. 2007/0066572, herein incorporated by reference in its entirety). Mitochondria-targeted antioxidants, which have been used in methods for treating cancer (see U.S. application Ser. No. 11/834,799, entitled "Methods for Reducing Anthracycline-Induced Toxicity." filed Aug. 7, 2007, and U.S. Ser. No. 12/554,476, entitled "mitochondria targeted anti-oxidant compounds for prevention, therapy or treatment of hyper-proliferative diseases, neoplasia and cancers" herein incorporated by reference in its entirety). Mitochondria-targeted antioxidants, which have been used in methods for treating degenerative bone disorder (see WO2006/35914, 2006, A1, entitled "Method and composition of treating degenerative bone disorders" herein incorporated by reference in its entirety).

In spite of the foregoing prior art, there remains a need for compositions and methods for effectively treating a condition that is caused by excessive mitochondrial production of reactive oxygen species (ROS) in the mitochondrial membrane.

Therefore, there remains a need for mitochondrially targeted free radical scavenging and antioxidant agents with improved pharmacodynamic and pharmacokinetic profiles. To address such need, the inventors of the instant application provide compounds by which it is possible to use the ability of mitochondria to concentrate specific lipophilic cations to take up linked antioxidants so as to target the antioxidant to the major source of free radicals and reactive oxygen species causing the oxidative stress.

SUMMARY

This application relates to compounds of Formula (I)

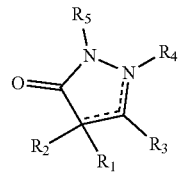

(Formula I)

wherein:

R$_1$ and R$_2$ are each independently selected form the group consisting of hydrogen, C$_{1-20}$ alkyl, C$_{2-20}$-alkenyl, and C$_{2-20}$-alkynyl, optionally mono-, di- or tri-substituted with halogen, substituted and unsubstituted Aryl (mono and bicyclic), substituted and unsubstituted heteroaryl (mono and bicyclic);

R$_3$ is selected from the group consisting of hydrogen, C$_{1-20}$ alkyl, C$_{2-20}$-alkenyl, and C$_{2-20}$-alkynyl, wherein R$_3$ may be substituted by one or more of A;

R$_4$ is selected from the group consisting of hydrogen, C$_{1-20}$ alkyl, C$_{2-20}$-alkenyl, and C$_{2-20}$ alkynyl, wherein R$_4$ may be substituted by one or more A; and R$_5$ is selected from the group consisting of aryl, heteroaryl, C$_{1-2}$ alkyl-aryl, and C$_{1-2}$ alkyl-heteroaryl, wherein A is aryl or heteroaryl.

In one embodiment disclosed herein, the instant application relates to a compound as described above, wherein the aryl and the heteroaryl are optionally mono-, di or tri substituted with substituents selected from the group consisting of halogen, C$_{1-6}$ alkyl, —CF$_3$, —OCF$_3$, C$_{1-6}$ alkoxy, C$_{3-6}$ cycloalkoxy, halo-C$_{1-6}$ alkyl, aryl, heteroaryl, heterocyclo, C$_{3-6}$ cycloalkyl, and C$_{3-6}$ cycloalkenyl.

In one aspect of the embodiment disclosed herein, the instant application relates to a compound as described above, wherein at least one of $R_1$, $R_2$, $R_3$, $R_4$ and $R_5$ is selected from the group consisting of

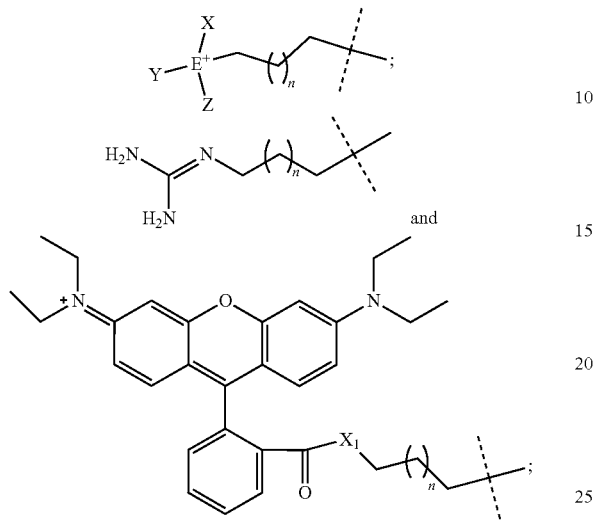

and wherein X, Y, Z are selected from the group consisting of hydrogen, methyl, ethyl, propyl, butyl, substituted or unsubstituted aryl and heteroaryls; n is an integer selected from 0-18 and E is phosphorous or nitrogen atom, $X_1$ is sulfer, Nitrogen or oxygen atom.

In another aspect of the embodiment disclosed herein, the instant application relates to a compound as described above, wherein $R_1$, $R_2$, $R_3$ and $R_4$ are each independently selected from the group consisting of hydrogen, $C_{1-20}$ alkyl, $C_{2-20}$-alkenyl, and $C_{2-20}$-alkynyl.

In another aspect of the embodiment disclosed herein, the instant application relates to a compound as described above wherein $R_5$ is selected from the group consisting of aryl, heteroaryl, $C_{1-2}$ alkyl-aryl, and $C_{1-2}$ alkyl-heteroaryl.

In another aspect of the embodiment disclosed herein, the instant application relates to a compound as described above, wherein $R_1$, $R_2$ and $R_4$ can be hydrogen, $R_3$ can be —$CH_3$; and $R_5$ is

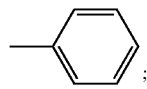

provided that at least one of the $R_2$, $R_3$ and $R_4$ is

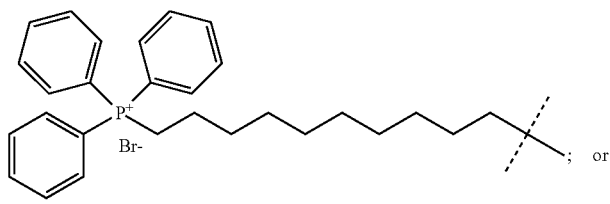; or

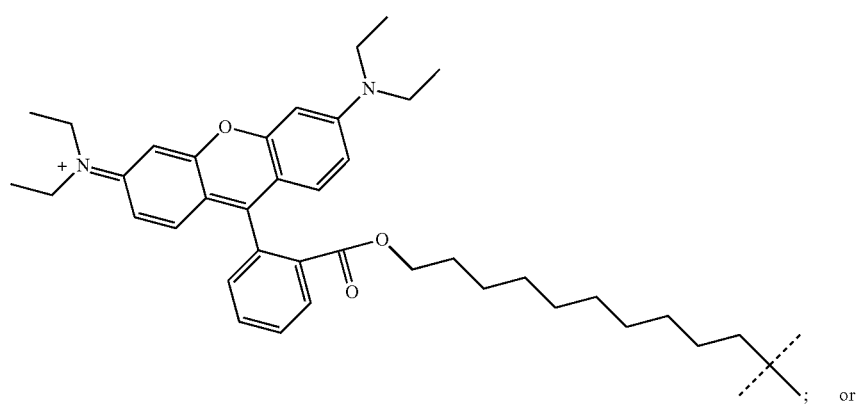; or

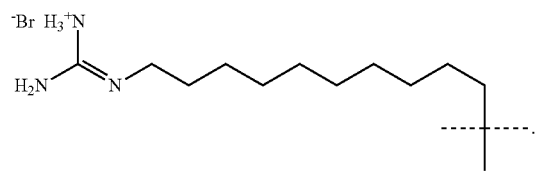.

In another embodiment disclosed herein, the instant application relates to pharmaceutically acceptable salts, hydrates, solvates, optic isomer, esters and combination thereof of a compound as described above.

BRIEF DESCRIPTION OF THE FIGURES

The accompanying drawings, which are incorporated in, and constitute a part of this specification, illustrate several aspects described below like numbers represent the same elements throughout the figures.

DETAILED DESCRIPTION

Figure 1:
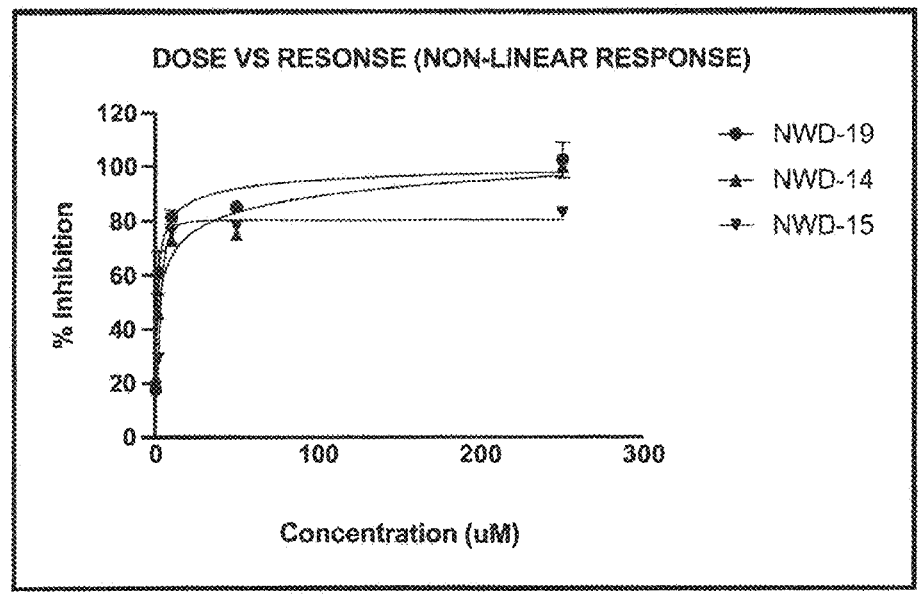
FIG. 1 shows dose response curve (non-linear regression using 4 parameter) for NWD-19, NWD-14 and NWD-15 using DPPH assay.

The terms used in the claims and in this application are defined as follows.

As used herein, a $C_1$-$C_{20}$ alkyl group or moiety can be a linear or branched alkyl group or moiety containing from 1 to 20 carbon atoms. Examples of $C_1$-$C_{20}$ alkyl groups and moieties include methyl, ethyl, n-propyl, i-propyl, n-butyl, i-butyl, t-butyl and 3-methyl-butyl etc.

As used herein, a $C_2$-$C_{20}$ alkenyl group or moiety is a linear or branched alkenyl group or moiety. Examples include methylene, ethylene and n-propylene groups and moieties.

As used herein, the halogen group can be selected from the group consisting of chlorine, fluorine, bromine and iodine.

As used herein, an aryl group is a functional group derived from a simple aromatic ring compound where one hydrogen atom is removed from the ring; typically, aryl group or moiety is phenyl, benzyl or naphthyl.

As used herein, the heteroaryl group is a heterocyclyl group derived from a heteroarene by removal of a hydrogen atom from any ring atom and replacing the same by a moiety selected from N, O, S, S(O) and S(O)$_2$. Examples include pyridyl, pyrazinyl, pyrimidinyl, pyridazinyl, furanyl, thienyl, pyrazolidinyl, pyrrolyl, oxadiazolyl, oxazolyl, isoxazolyl, thiazolyl, isothiazolyl thiadiazolyl, imidazolyl, pyridazolyl and pyrazolyl groups. Furanyl, thienyl, pyridazolyl, pyrazolyl, pyrimidinyl and thiazolyl groups are preferred.

As used herein, a $C_1$-$C_6$ alkoxy group is typically a said $C_1$-$C_6$ alkyl group attached to an oxygen atom.

As used herein, $C_{3-6}$ cycloalkyl group is a saturated hydrocarbon ring having from 3 to 6 carbon atoms; $C_{3-6}$ cycloalkenyl group is a hydrocarbon ring having from 3 to 6 carbon atoms and one or two double bonds; and $C_{3-8}$ cycloalkoxy means one of the $C_{3-8}$ cycloalkyl radicals linked via an oxygen atom.

The term "straight chain" as used herein, means a chemical structure in the form of an un-branched chain of atoms in a molecule with no attached side chains. Preferably said (un-branched) chain is an open chain. In contrast to that a "branched" structure includes one or more side chains attached to a chain of atoms in a molecule.

The term "substituted", as used herein, means that anyone or more hydrogens in the corresponding groups is replaced by another atom or group. e.g. "substituted alkyl" refers to an alkyl group in which one or more hydrogens are substituted, e.g. by halogen, hydroxy, or other atoms or groups.

The term "alkyl" refers to (straight or branched chain) hydrocarbon groups of 1 to 20 carbon atoms, including 1 to 6 carbon atoms. In general, herein the terms $C_1$, $C_2$, $C_6$, $C_{20}$ and the like refer to the number of C-atoms (carbon atoms) present in the corresponding groups. Example alkyl groups include, but are not limited to, methyl, ethyl, propyl (e.g., n-propyl and isopro-pyl), butyl (e.g., n-butyl, isobutyl, t-butyl), and pentyl (e.g., n-pentyl, isopentyl, neopentyl). The term "cycloalkyl" refers to a saturated cyclic hydrocarbon ring system. The terms "alkylaryl", "arylalkyl", "cycloalkylaryl", and "arylcycloalkyl" refer to an alkyl bonded to an aryl, an aryl bonded to an alkyl, a cycloalkyl bonded to an aryl and an aryl bonded to a cycloalkyl, respectively.

The term "alkoxy" refers to an alkyl group bonded to oxygen. Alkoxy includes, but is not limited to, methoxy, ethoxy and others. The term "alkoxyalkyl" refers to an alkoxy group having (another) alkyl group bonded to the oxygen of the alkoxy group. Alkoxyalkyl includes, but is not limited to, methoxymethyl, ethoxyethyl and others. The term "alkenyl" refers to hydrocarbon groups, having at least one double bond. The definition of compounds described herein includes all possible "stereoisomers" and their mixtures. In particular, the racemic forms and the isolated optical isomers having the specified activity are included. The racemic forms can be resolved by physical methods, such as, for example fractional crystallization, separation or crystallization of diastereomeric derivatives or separation by chiral column chromatography. The individual optical isomers can be obtained from the racemates from the conventional methods, such as, for example, salt formation with an optically active acid followed by crystallization.

The term "tautomers" refers to constitutional isomers of the compounds described herein that readily interconvert by a chemical reaction called tautomerisation. This reaction commonly results in the formal migration of a hydrogen atom or proton, accompanied by a switch of a single bond and adjacent double bond. As used herein, the salts of any one of the compounds disclosed in this application are pharmacologically acceptable salts and examples include metal salts such as alkali metal salts (for example, sodium salt potassium salt, etc.), alkaline earth metal salts (for example, calcium salt, magnesium salt, etc.), salts of inorganic bases such as ammonium salt, alkaline metal carbonates (for example, lithium carbonate, potassium carbonate, sodium carbonate, cesium carbonate, etc.), alkaline metal hydrogen carbonates (for example, lithium hydrogen carbonate, sodium hydrogen carbonate, potassium bicarbonate, etc.), alkali metal hydroxides (for example, lithium hydroxide, sodium hydroxide, potassium hydroxide, cesium hydroxide, etc.); for example, salts of organic bases such as tri(lower)alkylamine (for example, trimethylamine, triethylamine, N-ethyldiisopropylamine), pyridine, quinoline, piperidine, imidazole, picoline, dimethylaminopyridine, dimethylaniline, N-(lower)alkyl-morpholine (for example, N-methylmorpholine), 1,5-diazabicyclo[4.3.0]nonene-5

(DBN), 1,8-diazabicyclo[5.4.0]undecene-7 (DBU), 1,4-diazabicyclo[2.2.2]octane (DABCO); salts of inorganic acids such as hydrochloride, hydrobromide, hydroiodide, sulfate, nitrate, phosphate; salts of organic acids such as formate, acetate, propionate, oxalate, malonate, succinate, fumarate, maleate, lactate, malate, citrate, tartrate, carbonate, picrate, methanesulfonate, ethanesulfonate, p-toluenesulfonate, glutamate.

The compounds described herein may also have "prodrug" forms. Since prodrugs are known to enhance qualities of pharmaceuticals (e.g., solubility, manufacturing etc.) the compounds of the present invention may be delivered in prodrug form. "Prodrugs" are intended to include any covalently bonded carriers that release an active parent drug of the instant application in vivo when such prodrug is administered to a mammalian subject.

Prodrugs include compounds described herein, wherein e.g. a hydroxyl, amino or other group is bonded to any group that, when the prodrug is administered, cleaves to form a free hydroxyl, free amino or other, respectively. Examples of prodrugs include, but are not limited to, acetate, formate, and benzoate derivates of alcohol and amine function groups in the compounds of the present invention.

As used herein, "pharmaceutically acceptable salts" refer to compounds wherein the base compound is modified by making acid or base salts thereof. Pharmaceutically acceptable salts include, but are not limited to, mineral or organic acid salts of basic residues such as amines; alkali or organic salts of acidic residues such as carboxylic acids; and the like. In another embodiment, the pharmaceutically acceptable salts include the conventional non-toxic salts or the quaternary ammonium salts of the parent compound formed, for example, from non-toxic inorganic or organic acids. Preferably, conventional non-toxic salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, isethionic, and the like.

As used herein, the term "pharmaceutically acceptable carrier" refers to a carrier or an adjuvant that may be administered to a patient, together with a compound disclosed herein, or a pharmaceutically acceptable salt thereof, and which does not destroy the pharmacological activity thereof and is nontoxic when administered in doses sufficient to deliver a therapeutic amount of the compound.

As used herein, the term "composition" encompasses a product comprising the specified ingredients in the specified amounts, as well as any product which results, directly or indirectly, from combination of the specified ingredients in the specified amounts. Such term in relation to pharmaceutical composition, is intended to encompass a product comprising the active ingredient(s), and the inert ingredient(s) that make up the carrier, as well as any product which results, directly or indirectly, from combination, complexation or aggregation of any two or more of the ingredients, or from dissociation of one or more of the ingredients, or from other types of reactions or interactions of one or more of the ingredients. Accordingly, the pharmaceutical compositions described in the instant application encompass any composition made by admixing a compound described herein, or a pharmaceutically acceptable salt thereof, and a pharmaceutically acceptable carrier. By "pharmaceutically acceptable" it is meant the carrier, diluent or excipient must be compatible with the other ingredients of the formulation and not deleterious to the recipient thereof.

The phrase "therapeutically effective amount" is intended to include an amount of a compound described herein that is effective when administered alone or in combination. This phrase is also intended to include an amount of a combination of the claimed compounds that is effective to stimulate endogeneous regeneration of terminally differentiated cells in mammals. Preferably, said combination of compounds is a synergistic combination. Such synergy occurs when the effect of the compounds when administered in combination is greater than the additive effect of the compounds when administered alone as a single agent.

The terms "treating" or "treatment", as used herein, cover the treatment of a disorder-state in a mammal, particularly in a human, and include preventing the disorder-state from occurring in a mammal, e.g. said mammal is predisposed to the disorder, but is not diagnosed to have that disorder, inhibiting the disorder state, i.e. stopping further development, and/or relieving the disorder state, i.e. improving the symptoms of the disorder.

Compounds:

The present application discloses compounds, for targeting mitochondria, having the structure of formula (I), including pharmaceutically acceptable salts, stereoisomers, and prodrugs thereof.

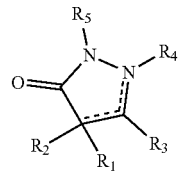

(Formula I)

wherein:

$R_1$ and $R_2$ is selected form the group consisting of —H, —$C_{1-20}$ alkyl, $C_{2-20}$-alkenyl, and $C_{2-20}$-alkynyl, optionally mono-, di- or tri-substituted with halogen, substituted and unsubstituted Aryl (mono and bicyclic), substituted and unsubstituted heteroaryl (mono and bicyclic)

$R_3$ is selected from the group consisting of —H, —$C_{1-20}$ alkyl, $C_{2-20}$-alkenyl, and $C_{2-20}$-alkynyl, wherein $R_3$ may be substituted by one or more A; aryl and heteroaryl $R_4$ is selected from the group consisting of —H, —$C_{1-20}$ alkyl, $C_{2-20}$-alkenyl, and $C_{2-20}$ alkynyl, wherein $R_4$ may be substituted by one or more A; aryl and heteroaryl $R_5$ is selected from the group consisting of (a) aryl, (b) heteroaryl, (c) —$C_{1-2}$ alkyl-aryl and (d) —$C_{1-2}$ alkyl-heteroaryl, wherein A is aryl or heteroaryl group;

wherein the aryl of choices (a) and (c), and the heteroaryl of choices (b) and (d), are optionally mono-, di- or tri-substituted with substituents selected from the group consisting of halogen, —$C_{1-6}$ alkyl, —$CF_3$, —$OCF_3$, —$C_{1-6}$ alkoxy, —$C_{3-6}$ cycloalkoxy, halo-$C_{1-6}$ alkyl, aryl, heteroaryl, heterocyclo, —$C_{3-6}$ cycloalkyl, and —$C_{3-6}$ cycloalkenyl.

provided at least one out of the $R_1$, $R_2$, $R_3$, $R_4$ and $R_5$ may be selected from the group consisting of

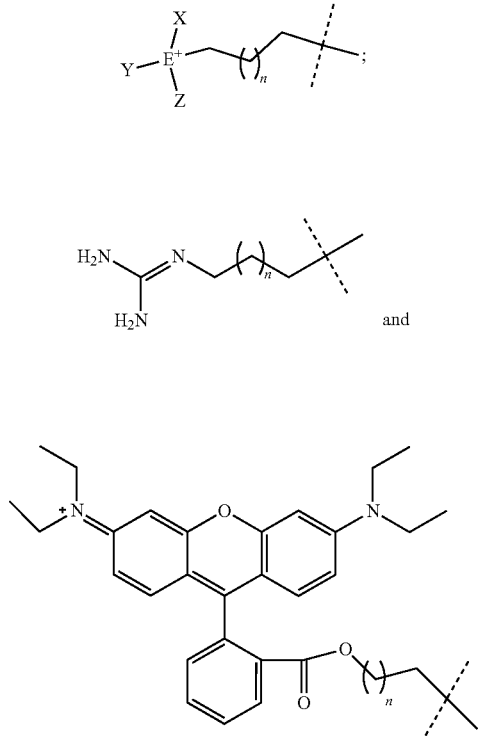

wherein X, Y, and Z are selected from the group consisting of hydrogen, methyl, ethyl, propyl, butyl, substituted or unsubstituted aryl and heteroaryls; n is an integer selected from 0-18 and E is phosphorous or nitrogen atom.

In one embodiment disclosed herein, the compound of formula (I) is represented by one of the following structures:

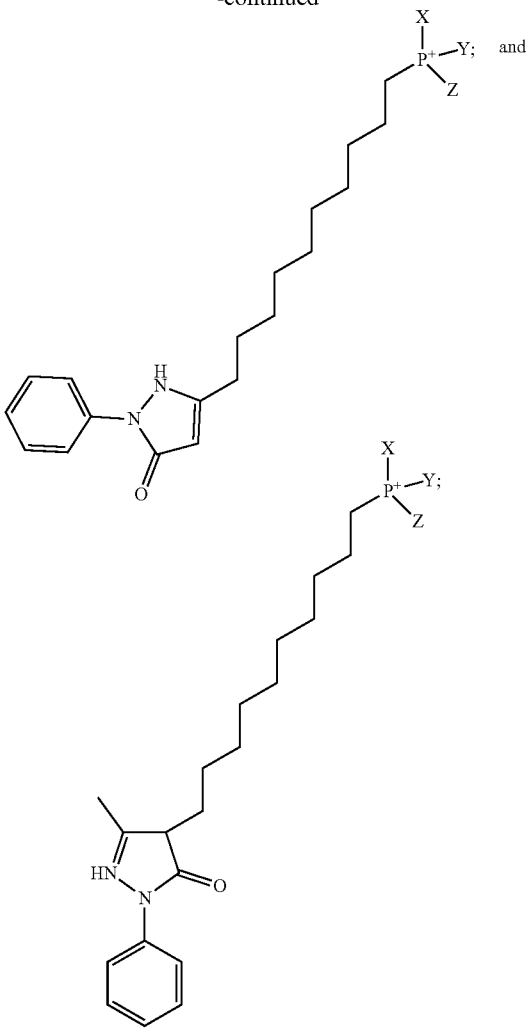

and a pharmaceutically acceptable salt thereof; wherein X, Y, and Z are as defined above.

In another embodiment, the compound of formula (I) is represented by one of the following structures:

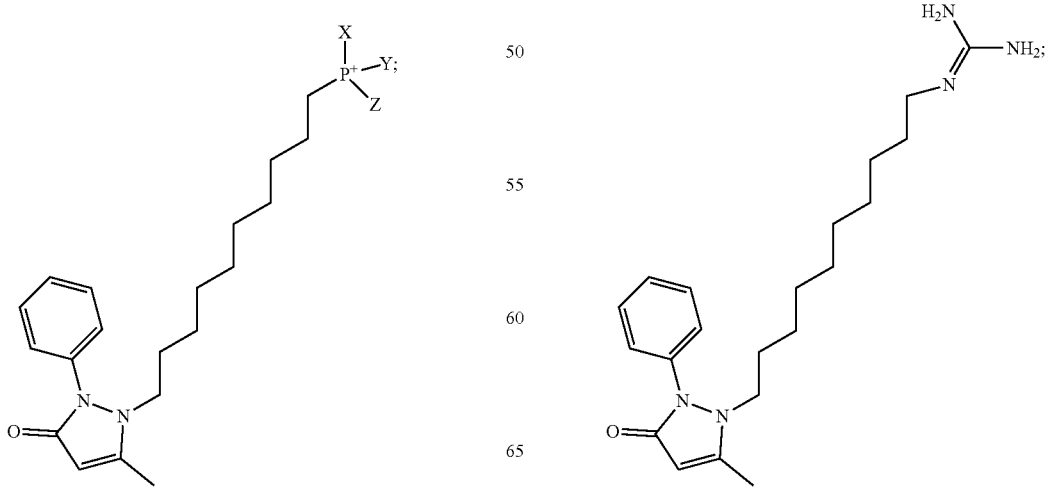

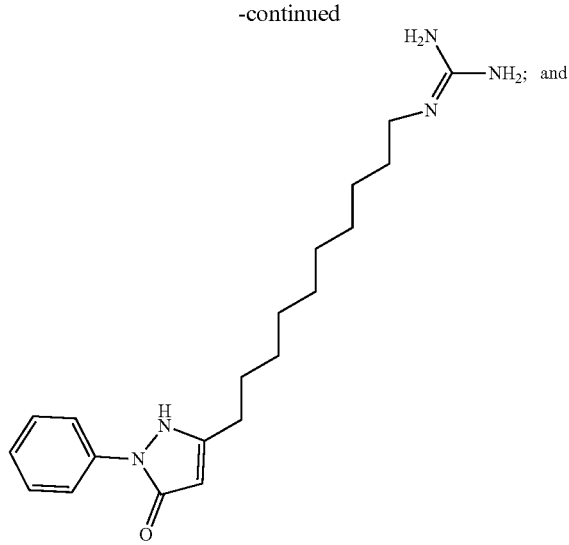
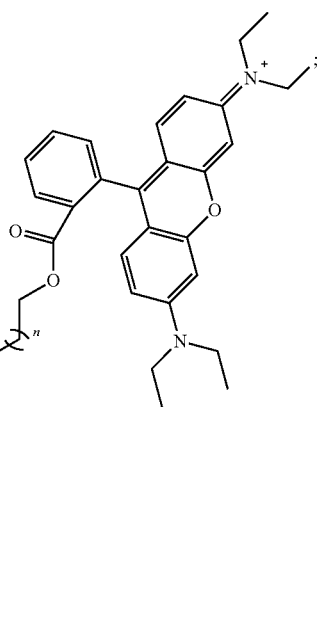
and a pharmaceutically acceptable salt thereof.
In a preferred embodiment disclosed herein, the compound of formula (I) is represented by one of the following structures:
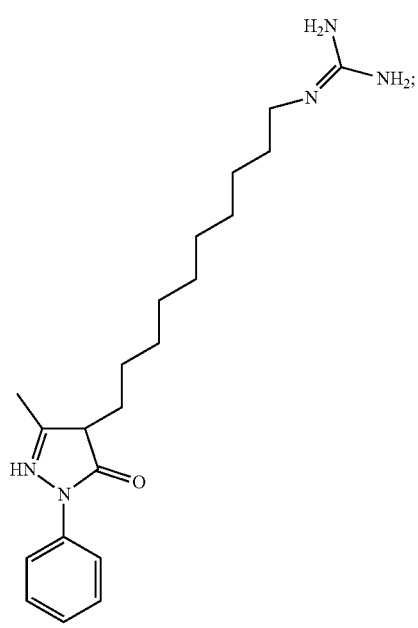
and a pharmaceutically acceptable salt thereof.
In another embodiment, the compound of formula (I) is represented by one of the following structures where n=6:
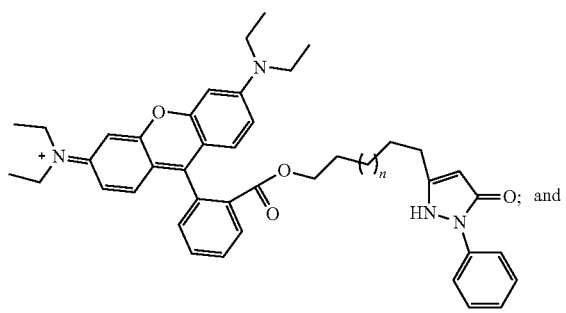
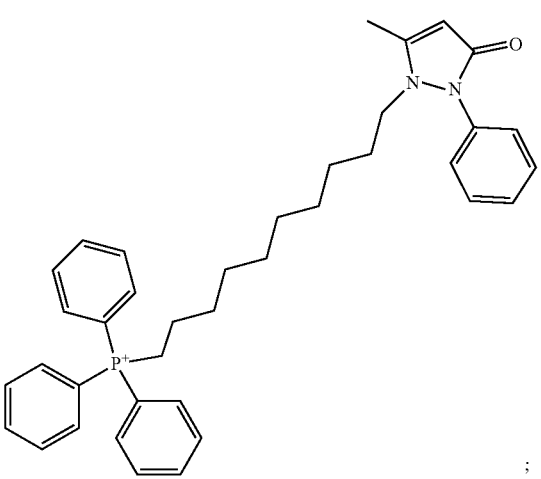

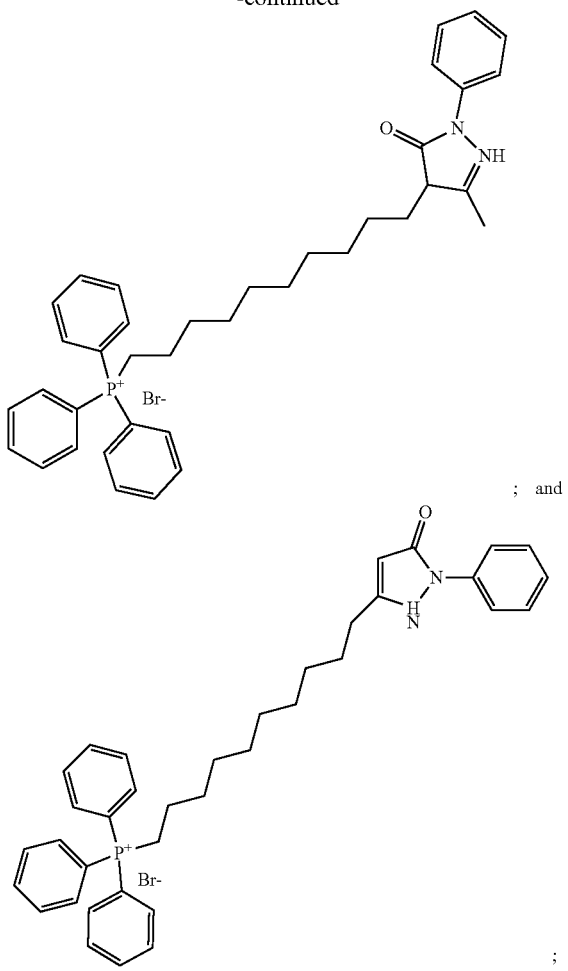

; and

;

and a pharmaceutically acceptable salt thereof.

In one embodiment, the compound of formula (I) contains one or more asymmetric centres and thus occur as racemates and racemic mixtures, enantiomerically enriched mixtures, single enantiomers, individual diastereomers and diastereomeric mixtures.

In one aspect of an embodiment disclosed herein, the compound of formula (I) comprises cis, trans, syn, anti, entgegen (E), zusammen (Z) isomers or a mixture thereof.

In another embodiment, the compounds described herein may also be represented in multiple tautomeric forms. In such instances, the instant application expressly includes all tautomeric forms of the compounds described herein, even though only a single tautomeric form may be represented. All such isomeric forms of such compounds are expressly included in the present invention.

In another embodiment disclosed herein, the compounds of the invention include salts and prodrugs. A salt, for example, can be formed between an anion and a positively charged substituent (e.g., amino) on a compound described herein. Suitable anions include chloride, bromide, iodide, sulfate, nitrate, phosphate, citrate, methanesulfonate, trifluoroacetate, and acetate. Likewise, a salt can also be formed between a cation and a negatively charged substituent (e.g., carboxylate) on a compound described herein. Suitable cations include sodium ion, potassium ion, magnesium ion, calcium ion, and an ammonium cation such as tetramethylammonium ion.

In one embodiment when the compound of the present invention is basic, salts may be prepared from pharmaceutically acceptable non-toxic acids, including inorganic and organic acids. Such acids include acetic, benzenesulfonic, benzoic, camphorsulfonic, citric, ethanesulfonic, fumaric, gluconic, glutamic, hydrobromic, hydrochloric, isethionic, lactic, maleic, malic, mandelic, methanesulfonic, mucic, nitric, pamoic, pantothenic, phosphoric, succinic, sulfuric, tartaric, p-toluenesulfonic acid, and the like. In one aspect of the invention the salts are citric, hydrobromic, hydrochloric, maleic, phosphoric, sulfuric, fumaric, and tartaric acids.

In another embodiment, when the compound of the present invention is acidic, salts may be prepared from pharmaceutically acceptable non-toxic bases, including inorganic and organic acids. In one of the embodiments, salts that may be prepared include lithium salt, sodium salt, potassium salt, magnesium salt, calcium salt, dicyclohexylamine salt, N-methyl-Dglucamine salt, tris(hydroxymethyl)methylamine salt, arginine salt, lysine salt, and the like.

In one embodiment, the compound of the invention may be radiolabeled with radioactive isotopes, such as for example tritium, iodine-125 or carbon-14. In a preferred embodiment, all isotopic variations of the compounds of the invention, whether radioactive or not, are intended to be encompassed within the scope of the invention. In some embodiments, hydrogen atoms of the compounds described herein may be replaced with deuterium atoms.

In some embodiments, compounds of Formula I can be prepared as prodrugs. Prodrugs are drug precursors that, following administration to a subject and subsequent absorption, are converted to an active, or a more active species via some process, such as conversion by a metabolic pathway.

The instant application also discloses a process to prepare pyrazolone core compound of formula 8.

(Formula 8)

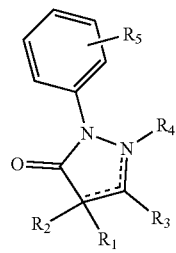

wherein:

$R_1$ and $R_2$ is selected form the group consisting of hydrogen, —$C_{1-20}$ alkyl, $C_{2-20}$-alkenyl, and $C_{2-20}$-alkynyl, optionally mono-, di- or tri-substituted with halogen, substituted and unsubstituted Aryl (mono and bicyclic), substituted and unsubstituted heteroaryl (mono and bicyclic)

$R_3$ is selected from the group consisting of hydrogen, —$C_{1-20}$ alkyl, $C_{2-20}$-alkenyl, and $C_{2-20}$-alkynyl, wherein $R_3$ may be substituted by one or more A; aryl and heteroaryl $R_4$ is selected from the group consisting of hydrogen, —$C_{1-20}$ alkyl, $C_{2-20}$-alkenyl, and $C_{2-20}$ alkynyl, wherein Ra may be substituted by one or more A; aryl and heteroaryl $R_5$ is selected from the group consisting of (a) hydrogen (b) aryl, (c) heteroaryl, (d) —$C_{1-2}$ alkyl-aryl, and (e) —$C_{1-2}$ alkyl-heteroaryl. For Formula 8, R5 can also be selected from groups like halogen, —C1-6 alkyl, —CF3, —SO2, —SO2NH2, —OCF3, —C1-6 alkoxy, —C3-6 cycloalkoxy, halo-C1-6 alkyl, aryl, heteroaryl, heterocyclo, —C3-6 cycloalkyl, and —C3-6 cycloalkenyl.

wherein A is aryl or heteroaryl group;
wherein the aryl of choices (a) and (c), and the heteroaryl of choices (b) and (d) are as described above;
provided at least one out of the $R_1$, $R_2$, $R_3$, $R_4$ and $R_5$ may be selected from the group consisting of

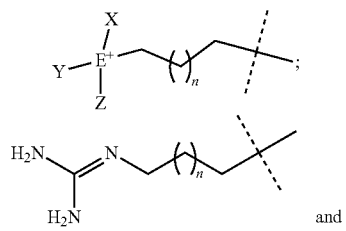

and

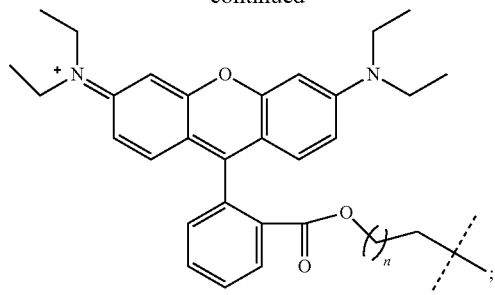

wherein n=1-20 and X, Y, Z are as described above.

In one embodiment, the process to prepare compound of formula I and pyrazolone core compound of formula 8 are described in the following scheme:

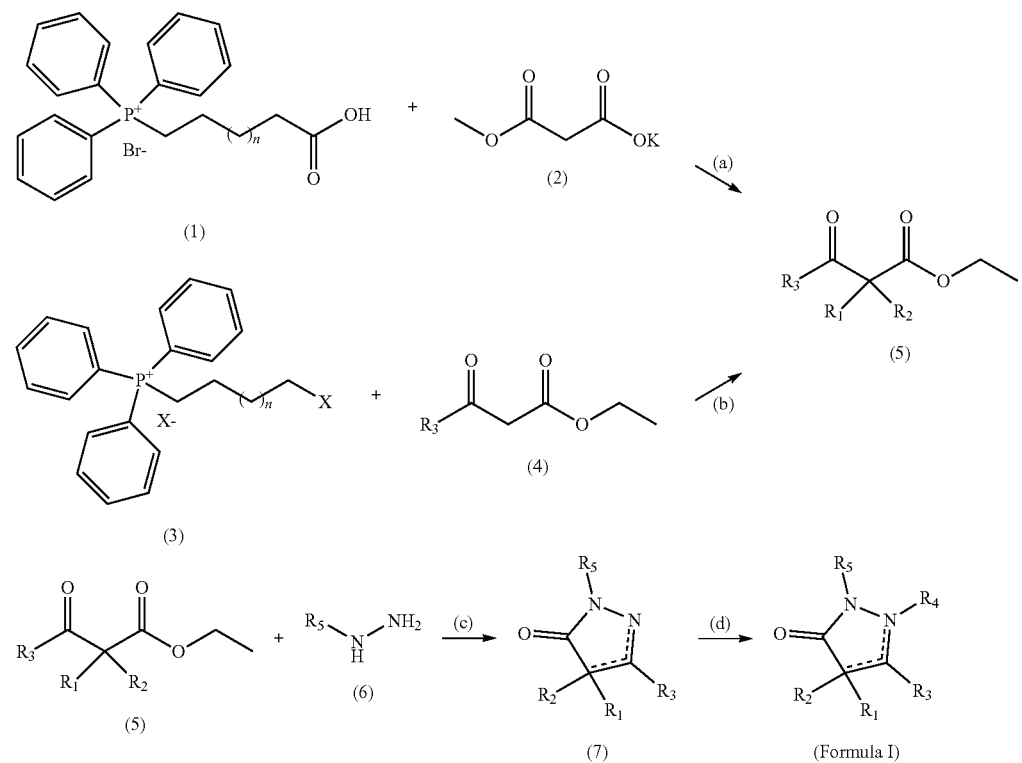

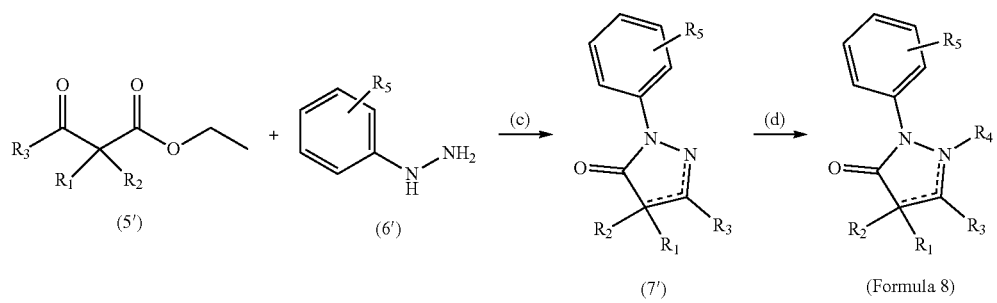

In one embodiment, the process to prepare rhodamine derivatives of compound with general formula I is described in the following scheme:

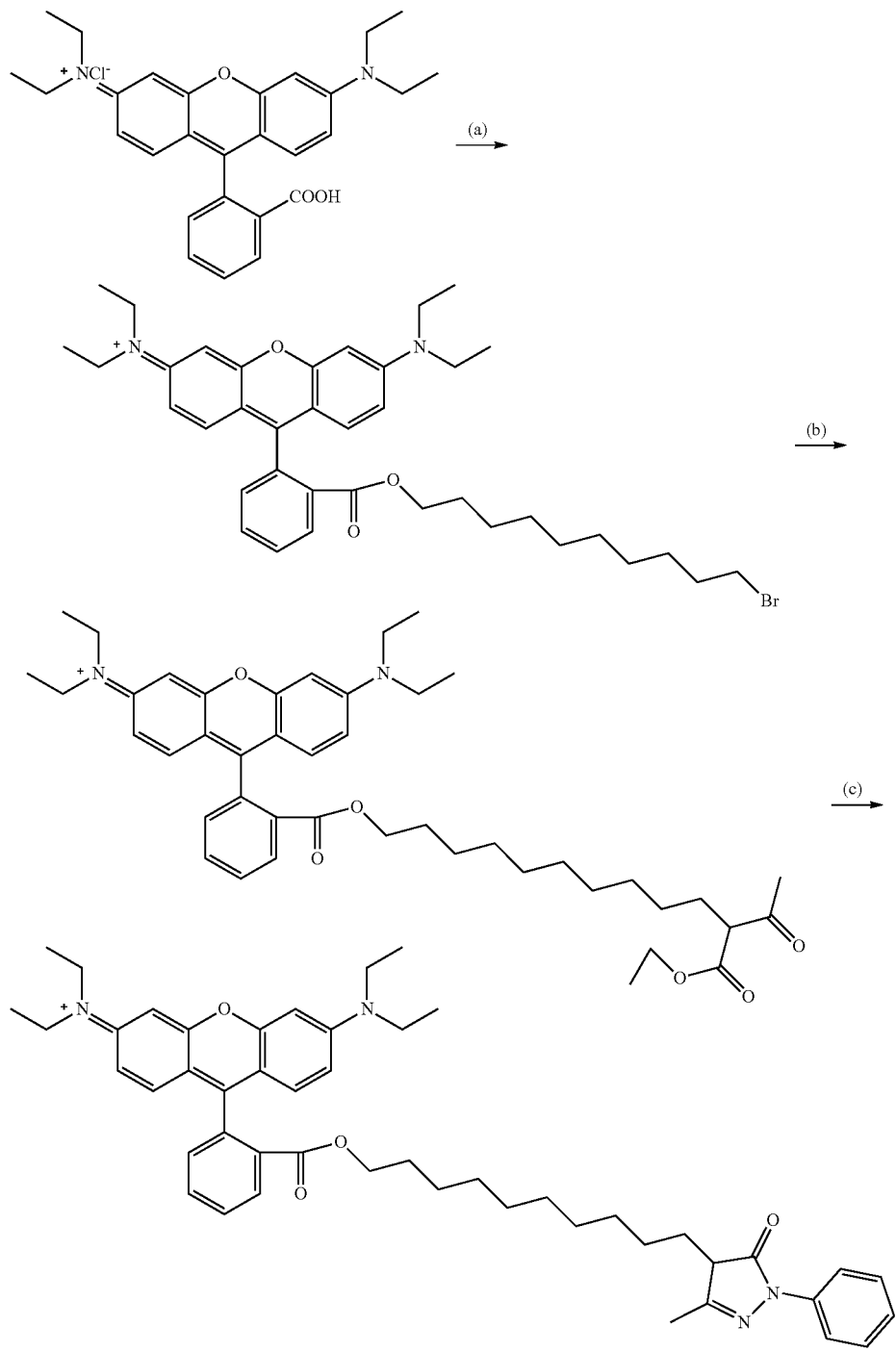

(a) CSCO3, 1,10-dibromodecane, MeOH, Reflux overnight; (b) Ethylacetoacetate, NaOEt, 85° C.; (c) Phenyl hydrazine, EtOH, 110° C.

In one embodiment, the compound of formula I or pyrazolone core of formula (8) found in the exemplified compounds could be conveniently accessed, for example, from the corresponding carboxylic acid (1) via its initial decarboxylative Claisen condensation with an appropriate monoester of malonic acid (2) in the presence of an appropriate activating reagent such as carbonyldiimidazole (i.e. CDI), an appropriate Lewis acid such as magnesium chloride, and an appropriate base such as triethylamine (i.e. TEA).

In another embodiment, a suitable intermediate (5) for getting the desired molecules can be generated from corresponding suitable ethyl acetoacetate or derivatives thereof (4) and lipophilic cation bearing halogenated alkene or alkane exemplified by bromobutyl triphenyl phosphene (3). This reaction between compounds of formulae (4) and (3) can be carried to generate anion of ethyl acetoacetate or derivatives thereof in presence of appropriate base such sodium ethoxide in an alcohol solvent such as, for example, ethanol or methanol and these anion of ethyl acetoacetate or derivatives thereof can then be reacted with bromobutyl triphenyl phosphene (3) in THE or in suitable solvent go give desired intermediate of formula (5).

In another embodiment, the reaction is further carried out by heating either an intermediate (5) with hydrazine of formula (6) or (6') in an alcohol solvent such as ethanol or methanol or neat solvent less reaction as appropriate, in an enclosed reaction vessel which would then furnish the desired compound of formula (7) or (7').

These intermediates of formulae (7) or (7') could in turn be functionalized, as appropriate, via either a simple nucleophilic displacement reaction when $R_4$ is an alkyl or heteroalkyl group or via copper catalyzed N-arylation reaction when $R_4$ is an aryl or heteroaryl group.

In the former case of simple nucleophilic displacement reaction, a base such as, though not limited to NaH, $CS_2CO_3$ or $K_2CO_3$ is added along with $R_4$—X to pyrazolone intermediate (7) or (7') in a polar, aprotic solvent.

In the latter case of copper catalyzed N-arylation reaction, a convenient source of copper(I) such as copper iodide, a suitable ligand such as praline, and a suitable base such as $Cs_2CO_3$, are heated along with to $R_4$—X to intermediate (7) or (7') in a polar, aprotic solvent to get pyrazolone core compound of formula (8) or compound of formula (I).

In another embodiment, the reagents and conditions used for above schematic reaction are as follows:

(a) potassium 3-methoxy-3-oxopropanoate, CDI, $MgCl_2$, TEA;

(b) NaOEt, EtOH, r.t, then bromobutyl triphenyl phosphene in THF, 80° C.;

(c) Phenylhydrazine, 80-140° ° C.;

(d) $R_4$—X, $CsCO_3$, ACN/DMF, 60° C., 2-16 h.

In another embodiment, the compound of formula (8) is represented by one of the following structures:

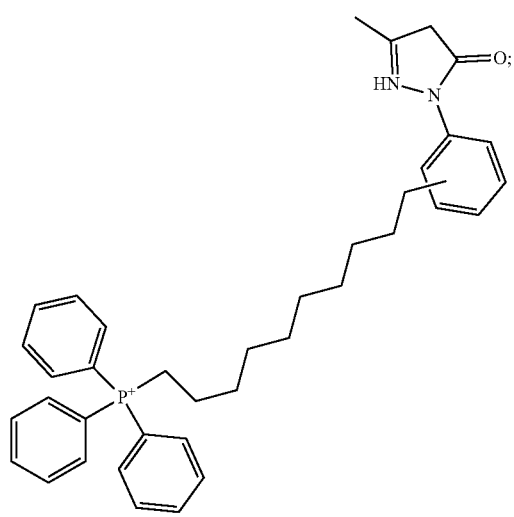

-continued

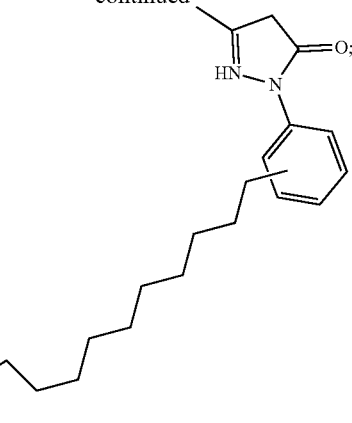

or a pharmaceutically acceptable salt thereof, where X, Y, Z are as described above.

In one embodiment disclosed herein, the starting materials used for the synthesis are either synthesized or obtained from commercial sources, such as, but not limited to, Sigma-Aldrich, Fluka, Acros Organics, Alfa Aesar, VWR Scientific, and the like. General methods for the preparation of compounds can be modified by the use of appropriate reagents and conditions for the introduction of the various moieties found in the structures as provided herein. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Pharmaceutical Compositions:

In one embodiment, the instant application provides a pharmaceutical composition comprising the compounds of formula I and formula 8 as described herein, or a salt thereof and a pharmaceutically acceptable carrier.

In another embodiment, the instant application provides a pharmaceutical composition and its process of preparation wherein process comprises mixing a mitochondrial targeted compounds of formula I and formula 8 or pharmaceutically acceptable salt thereof with a pharmaceutically acceptable carrier.

In another embodiment, the instant application includes, within the scope of the invention, prodrugs of the compounds of the invention. In general, such prodrugs will be functional derivatives of the compounds of this invention which are readily convertible in vivo into the required compound. Thus, in the methods of treatment described herein, the terms "administration of" or "administering a" compound shall encompass the treatment of the various conditions described with the compound specifically disclosed or with a compound which may not be specifically disclosed, but which converts to the specified compound in vivo after administration to the patient.

Conventional procedures for the selection and preparation of suitable prodrug derivatives are described, for example, in "Design of Prodrugs," ed. H. Bundgaard, Elsevier, 1985. Metabolites of these compounds include active species produced upon introduction of compounds described herein into the biological milieu.

In one embodiment described herein, the amount administered depends on the compound formulation, route of administration, and is generally empirically determined in routine trials. Preferably, the quantity of active compound in a unit dose of preparation may be varied or adjusted from about 0.0001 to 1, 3, 10 or 30 to about 30, 100, 300 or 1000 mg.

The compositions described herein may be administered in the dosage forms as described above in single or divided doses of one to ten times daily. It may be advisable to start a patient on a low dose combination and work up gradually to a high dose combination. More preferably, the compounds described herein or a pharmaceutically acceptable salt thereof, or its composition, may be administered from about 1 to about 6 times per day or alternatively, as a continuous infusion. Such administration can be used as a chronic or acute therapy. Lower or higher doses than those recited above may be required. In another embodiment, the total daily dosage may be divided and administered in portions during the day if desired.

In another embodiment, a compound described herein or pharmaceutically acceptable salt thereof or a composition thereof may, for example, be administered orally, parenterally (e.g., subcutaneously, intracutaneously, intravenously, intramuscularly, intraarticularly, intraarterially, intrasynovially, intrasternally, intrathecally, intralesionally and by intracranial injection or infusion techniques), by inhalation spray, topically, rectally, nasally, buccally, vaginally, via an implanted reservoir, by injection, subdermally, intraperitoneally, transmucosally, or in an ophthalmic preparation, with a dosage ranging from about 0.001 mg/kg to about 1000 mg/kg, (e.g., from about 0.001 to about 100 mg/kg, from about 0.1 to about 100 mg/kg, from about 1 to about 100 mg/kg, from about 1 to about 10 mg/kg) every 2 to 168 hours, or according to the requirements of the particular drug. Preferably, the compositions are administered by oral administration or by parenteral route via injection. The methods described herein contemplate administration of an effective amount of compound of the invention or its pharmaceutically acceptable salt or the composition of the compound of the invention to achieve the desired or stated effect.

In another embodiment described herein, specific dosage and treatment regimens for any patient will depend upon a variety of factors, including the activity of the specific compound employed, the age, body weight, general health status, sex, diet, time of administration, rate of excretion, drug combination, the severity and course of the disease, condition or symptoms, the patient's disposition to the disease, and the judgment of the treating physician.

In one embodiment, the compounds of formula I and formula 8 or its pharmaceutically acceptable salt thereof can be administered in a dose from about 0.00005 milligrams to about 2,000 milligrams. In another embodiment, the compounds of formula I and formula 8 or pharmaceutically acceptable salt thereof can be administered in a dose from about 0.1 milligrams to about 1,000 milligrams. In yet another embodiment, the compounds of formula I and formula 8 or its pharmaceutically acceptable salt thereof can be administered in a dose from about 0.1 milligrams to about 500 milligrams. In yet another embodiment, the compounds of formula I and formula 8 or its pharmaceutically acceptable salt thereof can be administered in a dose from about 0.1 milligrams to about 250 milligrams. Preferably, the compound of compounds of formula I and formula 8 or its pharmaceutically acceptable salt thereof can be administered in a dose from about 0.1 milligrams to about 100 milligrams. More preferably, the compounds of formula I and formula 8 or its pharmaceutically acceptable salt thereof can be administered in a dose from about 0.0001 milligrams to about 50 milligrams. Even more preferably, the compounds of formula I and formula 8 or its pharmaceutically acceptable salt thereof can be administered in a dose or from about 0.01 milligrams to about 25 milligrams. The dosage forms can further include a pharmaceutically acceptable carrier and/or an additional therapeutic agent.

In another embodiment disclosed herein, the compounds of the invention may be co-administered with one or more additional therapeutic agents. In one aspect of the embodiment, the additional agents may be administered separately (e.g., sequentially; on different overlapping schedules), as part of a multiple dose regimen, from the compounds of the invention. In some embodiments, these agents may be part of a single dosage form, mixed together with the compounds of this invention in a single composition. In yet another embodiment, these agents can be given as a separate dose that is administered at about the same time as that of compound the invention is administered. In another embodiment, the composition of the invention includes a combination of a compound of the invention and one or more additional therapeutic or prophylactic agents wherein both, the compound and the additional agent, can be present at dosage levels ranges from about 0.1% to about 100%; more preferably the compound and the additional agent can be present at dosage levels ranges from about 0.5% to about 98% of the dosage normally administered in a monotherapy regimen.

In another embodiment described herein, the compositions may contain any conventional non-toxic pharmaceutically acceptable carriers, adjuvants or vehicles. In some cases, the pH of the formulation may be adjusted with pharmaceutically acceptable acids, bases or buffers to enhance the stability of the formulated compound or its delivery form.

In one embodiment, the compositions described herein may be administered orally in any orally acceptable dosage form including, but not limited to, capsules, tablets, emulsions and aqueous suspensions, dispersions and solutions. In the case of tablets for oral use, carriers which are commonly used include lactose and corn starch. Lubricating agents, such as magnesium stearate, are also typically added. For oral administration in a capsule form, useful diluents include lactose and dried corn starch. When aqueous suspensions and/or emulsions are administered orally, the active ingredient may be suspended or dissolved in an oily phase and then combined with emulsifying and/or suspending agents. If desired, certain sweetening and/or flavoring and/or coloring agents may be added.

In one embodiment, the pharmaceutical preparation is prepared by using diluent or excipient such as filler, extending agent, binder, humectant, disintegrating agent, surfactant and lubricant. As for this pharmaceutical preparation, various forms can be selected depending on the purpose of treatment, and typical examples include a tablet, pill, powder, solution, suspension, emulsion, granule, capsule, suppository, and injection (solution, suspension).

In one embodiment, the instant application is related to the tablet formulation wherein conventionally known carrier can be widely used. As examples, excipient such as lactose, urea, starch saccharose, glucose, urea, starch, calcium carbonate, kaolin, sodium chloride, crystalline cellulose, silicate; binder such as water, ethanol, propanol, gelatine solution, potassium phosphate, glucose solution, shellac, starch liquid, carboxymethylcellulose, methylcellulose, polyvinylpyrrolidone; disintegrating agent such as sodium hydrogen carbonate, agar powder, dried starch, calcium carbonate, sodium alginate, laminaran powder, polyoxyethylene sorbitan fatty acid ester, sodium lauryl sulfate, starch, lactose, stearic acid monoglyceride; disintegration preventing agent such as saccharose, stearin, sorbefacient such as quaternary ammonium base, cacao butter, hydrogenated oil; sodium lauryl sulfate; moisturizing agent such as glycerine, starch; absorbing agent such as starch, lactose, kaolin, bentonite, colloidal silica; lubricant such as polyethylene glycol, purified talc, stearate, borate powder, can be used, for example. Furthermore, the tablet may be a tablet provided with conventional coating as required, for example, sugar-coated tablet, gelatine encapsulated tablet, enteric coating tablet, film coated tablet or double tablet, multilayer tablet.

In another embodiment, the instant application is related to the pill dosage form wherein conventionally known carriers can be widely used. Excipient such as glucose, hydrogenated vegetable oil, lactose, starch, cacao butter, kaolin, talc; binder such as powdered gum arabic, powdered tragacanth, gelatine, ethanol; disintegrating agent such as laminaran, agar are used.

In another embodiment, the instant application is related to the suppository dosage form wherein conventionally known carriers include polyethylene glycol, cacao butter, higher alcohol, esters of higher alcohol, gelatine, semisynthesized glyceride are used.

In one aspect of the invention, the instant application is related to the capsule dosage form which can be prepared according to a conventional method by mixing active ingredient compounds with various carrier exemplified above and filling them into a hard gelatin capsule, a soft capsule or the like.

In another embodiment, the instant application is related to the injection liquid dosage form. Preferably the solution, emulsion and suspension are sterilized and isotonic to the blood and for forming in these modes, any of those conventionally used in the art as diluent can be used, and, for example, water, ethyl alcohol, macrogol, propylene glycol, ethoxylated isostearyl alcohol, polyoxylated isostearyl alcohol, polyoxyethylene sorbitan fatty acid ester, etc. can be used.

In another embodiment, the instant application is related to the eye drop liquid dosage form. Preferably the solution, emulsion and suspension are sterilized and isotonic to the blood and for forming in these modes, any of those conventionally used in the art as diluent can be used, and, for example, Acetylcysteine, cystine hydrochloride hydrae, glycerin, PEG and PEG derivatives, sodium chloride, sodium bisulfite, sodium hydroxide, phosphoric acid, benzalkonium chloride, sodium dihydrogen phosphate dihydrate, sodium hydrogen phosphate dodecadydrate, boric acid, citric acid, hypromellose, N-acetyl-camnosine, potassium bicarbonate, purified benzyl alcohol, sterile water, etc. can be used.

There is no limitation in particular in the way of administration of the pharmaceutical preparation of the instant application and may be administered by a method in accordance with specific form of the preparation, age, sex and the other conditions of a patient, severity of disease, etc. For example, in the case of tablet, pill, solution, suspension, emulsion, granule and capsule, it is orally administered. In the case of injection, it is intravenously administered alone or in a mixture with conventional replacement fluid such as glucose and amino acids, and if necessary, and the preparation alone may be also administered intramuscularly, intracutaneously, subcutaneously, interperitoneally or ocularly. It is administered in rectum in the case of suppository. Applied dose of the pharmaceutical preparation of the present invention is appropriately selected in accordance with dosage regimen, age, sex and the other conditions of a patient, severity of disease, etc.

Methods of Use:

In one embodiment disclosed herein, therapeutically effective amounts of compounds of formula I and formula 8, pharmaceutically acceptable salts thereof or composition thereof are used in antioxidant therapy. In a preferred embodiment, selective antioxidant therapies for human or animal are used to prevent mitochondrial damage. This can be done by normalizing or by preventing the elevated mitochondrial oxidative stress associated with particular diseases, such as Cancer, Parkinson's disease, diabetes, Dry eye disease, Age Related Macular Degeneration or diseases associated with mitochondrial DNA mutations.

In another embodiment, the compounds of formula I and formula 8, pharmaceutically acceptable salts thereof or composition thereof may also be used in conjunction with cell transplant therapies for neurodegenerative diseases, to increase the survival rate of implanted cells.

The compounds described herein, pharmaceutically acceptable salts thereof or pharmaceutical compositions thereof can be used, in a therapeutically effective amount, for treating conditions involving oxidative stress in mammals wherein oxidative damage plays a key role in the aging process. By far the greatest risk factor for neurodegenerative diseases, such as Alzheimer's disease (AD), Parkinson's disease (PD), and amyotrophic lateral sclerosis (ALS), is aging. Mitochondria have been thought to contribute to aging through the accumulation of mitochondrial DNA mutations and net production of reactive oxygen species (ROS).

In addition, oxidative damage has a role in the etiology of hypoxic damage, cancer, and cardiovascular diseases associated with reperfusion, and neurodegenerative disorders. Oxidative stress also contributes diseases like Huntington's Chorea, diabetes, and Friedreich's Ataxia, and to nonspecific damage that accumulates with aging. It also contributes to inflammation and ischemic-reperfusion tissue injury in stroke and heart attack, and during organ transplantation and surgery.

In one embodiment, the compounds described herein, pharmaceutically acceptable salts thereof, or compositions thereof can also be used in ophthalmology wherein oxidative stress is involved in the pathogenesis of several eye diseases, such as senile cataract, age-related macular degeneration, uveitis, premature retinopathy, keratitis and ocular inflammation. The oxidized protein levels are increased in accordance with the elevated inflammatory activity during these diseases. Oxidative stress plays major role in pathogenesis of several forms of dry eyes and therapeutic modalities employing topical/systemic use of antioxidants may be useful.

In another aspect, the instant application provides methods of transplanting a cell or a tissue to a subject. In a preferred embodiment, the instant application is directed to a method that could be used as prophylactics to protect organs during transplantation or ameliorate the ischemia-reperfusion injury that occurs during Surgery. The compounds of the invention, pharmaceutically acceptable salts thereof, or compositions thereof could also be used to reduce cell damage following stroke and heart attack or be given prophylactically to premature babies, which are susceptible to brain ischemia.

In another embodiment, method of treatment by administering the compounds described herein shall encompass the treatment of the various conditions described with the compound specifically disclosed or with a compound which may not be specifically disclosed, but which converts to the specified compound in vivo after administration to the patient.

In one of the embodiments disclosed herein, the methods have a major advantage over current antioxidant therapies that they will enable antioxidants to accumulate selectively in mitochondria, the part of the cell under greatest oxidative stress. This will greatly increase the efficacy of antioxidant therapies. Related lipophilic cations are tested as potential anti-oxidant drugs (in vitro) and are known to be relatively non-toxic to whole animals, therefore these mitochondrially targeted antioxidants may be devoid of harmful side effects.

The compounds disclosed herein can, for example, be prepared according to the following reaction schemes.

Example 1: Synthesis of (4-(5-methyl-3-oxo-2-phenyl-2,3-dihydro-1H-pyrazol-1-yl) butyl) triphenyl phosphonium bromide (NWD-11)

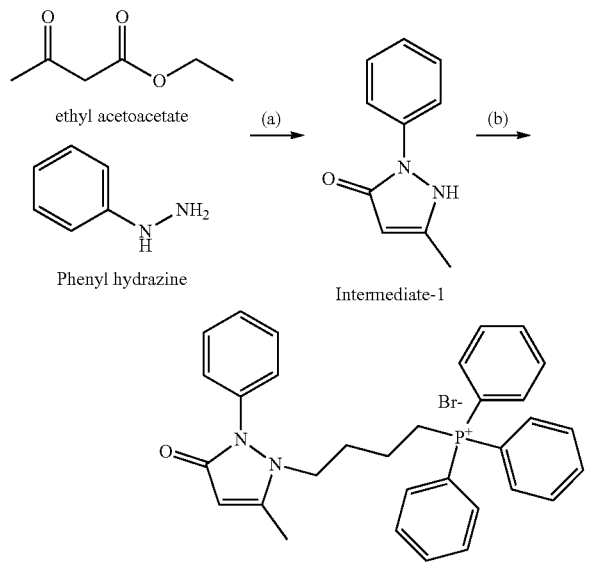

Reagents and conditions: (a) phenyl hydrazine, ethanol, reflux, 3 h, 90%.
(b) bromobutyl triphenyl posphene, CsCO3, ACN/DMF, 60 C., 2~16 h Equimolar amount of ethyl acetoacetate was added into a 100 mL round bottom flask containing phenyl hydrazine in Ethanol. This mixture was then stirred at room temperature for 5 min then refluxed for 5 h. After completion of reaction the solvent was removed and yellowish solid (intermediate-I) was precipitated by adding diethyl ether. Precipitated solid was dried under vacuum and dissolved in 10 mL of DMF to get a clear solution. 4-bromobutyl triphenyl phosphene (1.1 eq.) and CsCO3 (1.1 eq.) were added into above solution and this mixture was then heated at 65 to 70° C. for 4 h. After 4 h reaction mixture was cooled to room temperature and poured into ice cold water. Finally, desired compound was extracted three times with Chloroform. All the organic layers were combined and dried over sodium sulfate. Solvent was removed under reduced pressure and resulting crude was purified by column chromatography (DCM:MeOH, 9:1) to give white solid (45% yield) as final compound which was characterized by TLC (Rf=0.45, DCM:MeOH, 9:1) and mass spectrometry (M/Z=491.3) as (4-(5-methyl-3-oxo-2-phenyl-2,3-dihydro-1H-pyrazol-1-yl) butyl) triphenyl phosphonium bromide.

Example 2: (4-(5-oxo-1-phenyl-2,5-dihydro-1H-pyrazol-3-yl) butyl) triphenyl phosphonium bromide (NWD-14)

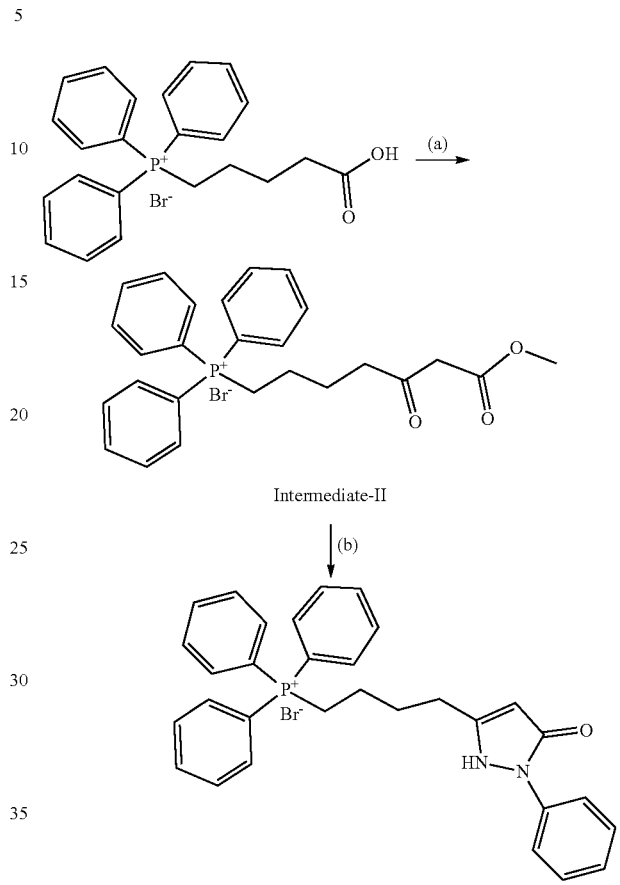

Reagents and conditions: (a) potassium 3-methoxy-3-oxopropanoate, CDI, MgCl2, TEA. (b) phenyl hydrazine To an acetonitrile solution (0.05 M) of (4-carboxybutyl) triphenyl phosphonium (1 eq.) was added CDI (1.1 eq.). The resulting yellow solution was then allowed to stir at RT for 2.5 h (This solution turns into white precipitate) before it was added portion wise, over a period of 0.5 h, into a white suspension of potassium 3-methoxy-3-oxopropanoate (2.1 eq.), magnesium chloride (2.5 eq.) and triethylamine (3.2 eq.). The resulting suspension was then stirred at RT for 2 h and finally heated at reflux for another 24 h. The crude reaction suspension thus obtained was cooled to RT and diluted with water and the pH was adjusted to 7.9 to 8.2 with 10% HCl. The desired intermediate was extracted DCM three times. All the organic layers were combined and washed with brine and water. Finally, organic layer was dried over sodium sulfate and concentrated to get intermediate-II as dark oily mass (75% yield) which can be used without further purification. Intermediate-II was dissolved in ethanol and 1.5 eq. of phenyl hydrazine monohydrate was added into it to get solution. Reaction mixture was refluxed at 80° C. for 1 h then at 140° ° C. for 4 h. Reaction turns into a sticky mass on cooling to RT. Desired compound was precipitated with diethyl ether and filtered. Finally, it was purified by silica gel chromatography to give (4-(5-oxo-1-phenyl-2,5-dihydro-1H-pyrazol-3-yl) butyl) triphenyl phosphonium bromide as dark yellow solid (35% yield), as final compound which was characterized by TLC (Rf=0.46, DCM: MeOH, 9:1) and mass spectrometry LC-MS: 477.1 (M/Z).

Example 3: (10-(5-oxo-1-phenyl-2,5-dihydro-1H-pyrazol-3-yl)decyl)triphenylphosphonium bromide (NWD-22)

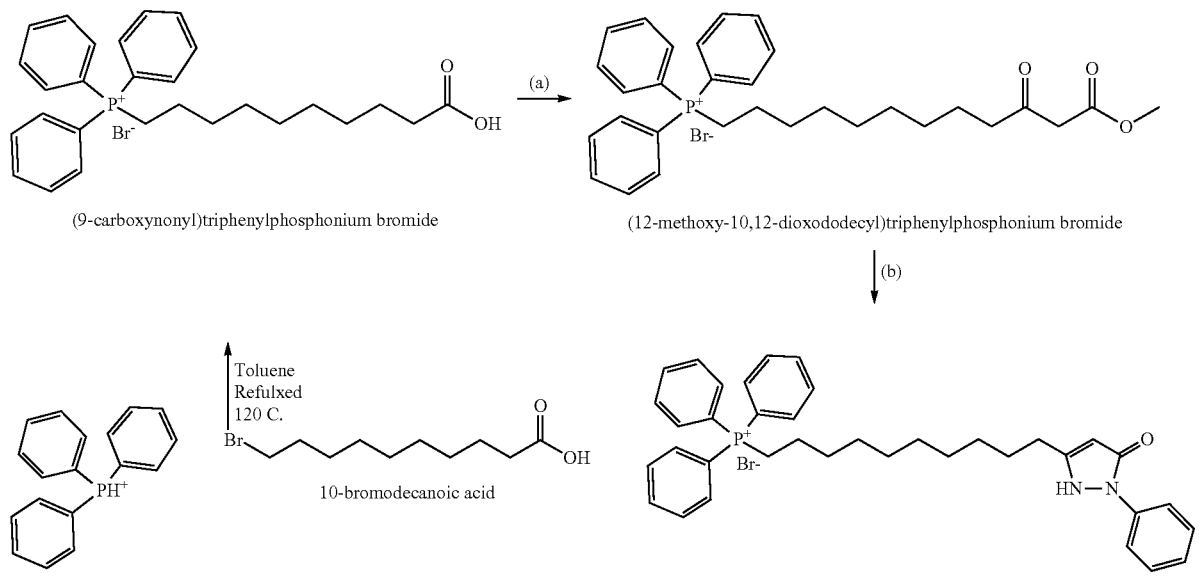

Reagents and conditions: (a) potassium 3-methoxy-3-oxopropanoate, CDI, MgCl2, TEA. (b) phenyl hydrazine (9-carboxynonyl) triphenyl phosphonium bromide was prepared by refluxing 10-bromodecanoic acid with triphenyl phosphine in toluene. (9-carboxynonyl) triphenyl phosphonium bromide was purified and reacted CDI (1.1 eq.). The resulting yellow solution was then allowed to stir at RT for about 2-2.5 h (This solution turns into white precipitate) before it was added portion wise, over a period of 0.5 h, into a white suspension of potassium 3-methoxy-3-oxopropanoate (2.1 eq.), magnesium chloride (2.5 eq.) and triethylamine (3.2 eq.). The resulting suspension was then stirred at RT for 2 h and finally heated at reflux for another 24 h. The crude reaction suspension thus obtained was cooled to RT and diluted with water and the pH was adjusted to 7.9 to 8.2 with 10% HCl. The desired intermediate was extracted with DCM three times. All the organic layers were combined and washed with brine and water. Finally, organic layer was dried over sodium sulfate and concentrated to get (12-methoxy-10,12-dioxododecyl) triphenyl phosphonium bromide (Intermediate-III) as dark oily mass which was used without further purification. Intermediate-III was then dissolved in ethanol and 1.5 eq. of phenyl hydrazine monohydrate was added into it to get solution. Reaction mixture was refluxed at 80° C.-110° C. for 4-6 h. Reaction turns into a sticky mass on cooling to RT. Desired compound was precipitated with diethyl ether and filtered. Finally, it was purified by silica gel chromatography to give (10-(5-oxo-1-phenyl-2,5-dihydro-1H-pyrazol-3-yl) decyl) triphenyl phosphonium bromide as dark yellow solid (30% yield) as final compound which was characterized by TLC (Rf=0.51, DCM: MeOH, 9:1) and mass spectrometry LC-MS: 561.5 (M/Z).

Example 4: (4-(3-methyl-5-oxo-1-phenyl-4,5-dihydro-1H-2l4-pyrazol-4-yl) butyl) triphenyl-phosphonium bromide (NWD-15)

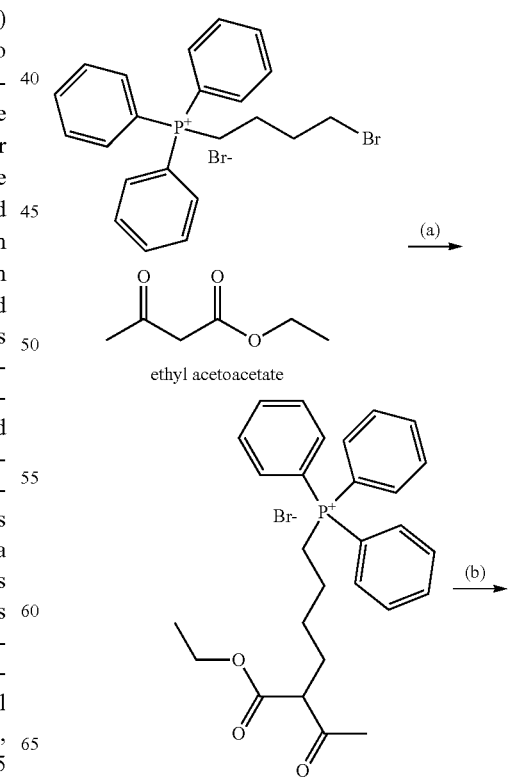

-continued

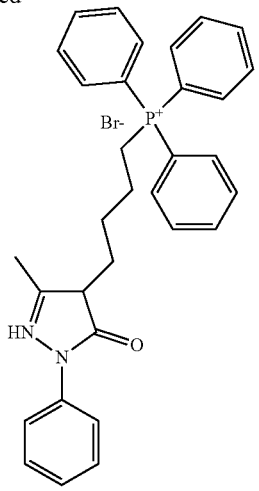

(a) NaOEt, EtOH, r.t, then bromobutyl triphenyl posphene in THF, 80° C.;
(b) phenylhydrazine, 140° C.

To a stirred solution of sodium ethoxide in ethanol (21% wt, 25 mmol), ethyl acetoacetate (25 mmol) was added at room temperature. The mixture was heated at 80° ° C. and after 30 min 4-bromobutyl triphenyl phosphene (25 mmol) in Ethanol was added to get a yellow color solution. After 30 min at RT reaction mixture turned into white suspension which was then refluxed for 24 h. After 24 h reaction mixture was cooled at RT and pH was adjusted to 6.5 with 1N HCl. Reaction mixture was partitioned between water and ethyl acetate. Organic layers were combined and subjected to washing with water and brine and dried over MgSO$_4$. Organic layer was concentrated under vacuum to get oily mass which was confirmed MS analysis to be desired intermediate-IV, which can be used without further purification. Equimolar amount to phenyl hydrazine monohydrate was added to the vessel containing intermediate-IV and the mixture thus formed was heated at 140° C. for 4 h. Finally, the desired compound was precipitated using ether and purified by silica gel chromatography to give desired compound as steaky solid in 40% yield which was characterized by TLC (Rf=0.53, DCM: MeOH, 9:1) and mass spectrometry LC-MS: 491.3 (M/Z).

Example 5: (10-(3-methyl-5-oxo-1-phenyl-4,5-dihydro-1H-pyrazol-4-yl) decyl) triphenyl phosphonium bromide (NWD-19)

To a stirred solution of sodium ethoxide in ethanol (21% wt, 25 mmol), ethyl acetoacetate (25 mmol) was added at room temperature. The mixture was heated at 80° C. and after 30 min (10-bromodecyl) triphenyl phosphonium (25 mmol) in Ethanol was added to get a yellow color solution. After 30 min at RT reaction mixture turned into white suspension which was then refluxed for 24 h. After 24 h reaction mixture was cooled at RT and pH was adjusted to 6.5-7.0 with 1N HCl. Reaction mixture was partitioned between water and ethyl acetate. Organic layers were combined and subjected to washing with water and brine and dried over MgSO$_4$. Organic layer was concentrated under vacuum to get oily mass which was confirmed MS analysis to be desired (11-(ethoxycarbonyl)-12-oxotridecyl) triphenyl phosphonium bromide (intermediate-V), which was be used without further purification. Equimolar amount of phenyl hydrazine monohydrate was added to the vessel containing intermediate-V and the mixture thus formed was heated at 100-120° C. for 4-5 h. Finally, the desired compound was precipitated using ether and purified by silica gel chromatography (28% yield). Compound thus isolated was characterized by TLC (Rf=0.48, DCM: MeOH, 9:1) and mass spectrometry LC-MS: 575.2 (M/Z).

Example 6: (10-(1-(3-ethylphenyl)-3-methyl-5-oxo-4,5-dihydro-1H-pyrazol-4-yl) decyl) triphenyl phosphonium (NWD-36)

To a stirred solution of sodium ethoxide in ethanol (21% wt, 25 mmol), ethyl acetoacetate (25 mmol) was added at room temperature. The mixture was heated at 80° C. and after 30 min (10-bromodecyl) triphenyl phosphonium (25 mmol) in Ethanol was added to get a yellow color solution. After 30 min at RT reaction mixture turned into white suspension which was then refluxed for 24 h. After 24 h reaction mixture was cooled at RT and pH was adjusted to 6.5-7.0 with 1N HCl. Reaction mixture was partitioned between water and ethyl acetate. Organic layers were combined and subjected to washing with water and brine and dried over MgSO$_4$. Organic layer was concentrated under vacuum to get oily mass which was confirmed MS analysis to be desired (11-(ethoxycarbonyl)-12-oxotridecyl) triphenyl phosphonium bromide (intermediate-V), which was be used without further purification. Equimolar amount of (3-ethyl) phenyl hydrazine monohydrate was added to the vessel containing intermediate-V and the mixture thus formed was heated at 100-120° ° C. for 4-5 h. Finally, the desired compound was precipitated using ether and purified by silica gel chromatography to gibe (42% yield) and characterized by TLC (Rf=0.61, DCM: MeOH, 9:1) and mass spectrometry LC-MS: 603.2 (M/Z).

Example 7: (10-(3-methyl-1-(3-(methylsulfonyl) phenyl)-5-oxo-4,5-dihydro-1H-pyrazol-4-yl)decyl) triphenyl phosphonium bromide To a stirred solution of sodium ethoxide in ethanol (21% wt, 25 mmol), ethyl acetoacetate (25 mmol) was added at room temperature. The mixture was heated at 80° C. and after 30 min (10-bromodecyl) triphenyl phosphonium (25 mmol) in Ethanol was added to get a yellow color solution. After 30 min at RT reaction mixture turned into white suspension which was then refluxed for 24 h. After 24 h reaction mixture was cooled at RT and pH was adjusted to 6.5-7.0 with 1N HCl. Reaction mixture was partitioned between water and ethyl acetate. Organic layers were combined and subjected to washing with water and brine and dried over MgSO$_4$. Organic layer was concentrated under vacuum to get oily mass which was confirmed MS analysis to be desired (11-(ethoxycarbonyl)-12-oxotridecyl) triphenyl phosphonium bromide (intermediate-V), which was be used without further purification. Equimolar amount of 1-[4-methylsulfonyl] phenyl] hydrazine was added to the vessel containing intermediate-V and the mixture thus formed was heated at 100-120° C. for 4-5 h. Finally, the desired compound was precipitated using ether and purified by silica gel chromatography to gibe (45% yield) and characterized by TLC (Rf=0.63, DCM: MeOH, 9:1) and mass spectrometry LC-MS: 653.2 (M/Z).

Example 8: 2-(10-(3-methyl-5-oxo-1-phenyl-4,5-dihydro-1H-pyrazol-4-yl) decyl) guanidine, bromide salt (NWD-30)

Guanidine (2.2 g, 0.023 moles) was dissolved in 25 mL dichloromethane and 10 mL 25% NaOH (solution in water)

was added into it to get a clear solution. Above clear solution was cooled on ice bath and 5 mL of 1,10 dibromodecane was added into it followed by 1 mg of NaI. Ice bath was warmed to rt, and reaction continued for 48 h. After 48 h reaction was stopped and layers were separated. Aqueous layer was washed with 2×25 ml of dichloromethane.

All the organic layers were combined and dried over Na2SO4. Organic layer was concentrated under reduced presser at 40° C. water bath temperature to get low melting point product which was characterized as 2-(10-bromodecyl) guanidine by MS. This was then reacted with activated ethyl acetoacetate at 85° C. for 24 h to get ethyl 2-acetyl-12-((diaminomethylene)amino) dodecanoate. After acidic workup and purification this was reacted with equimolar amount of phenyl hydrazine by using the condition mentioned in example 7. After hexane precipitation and column desired compound obtained at light yellow semi solid (yield 12%) which was characterized as 2-(10-(3-methyl-5-oxo-1-phenyl-4,5-dihydro-1H-pyrazol-4-yl) decyl) guanidine by LC-MS: 359.3 (M/Z).

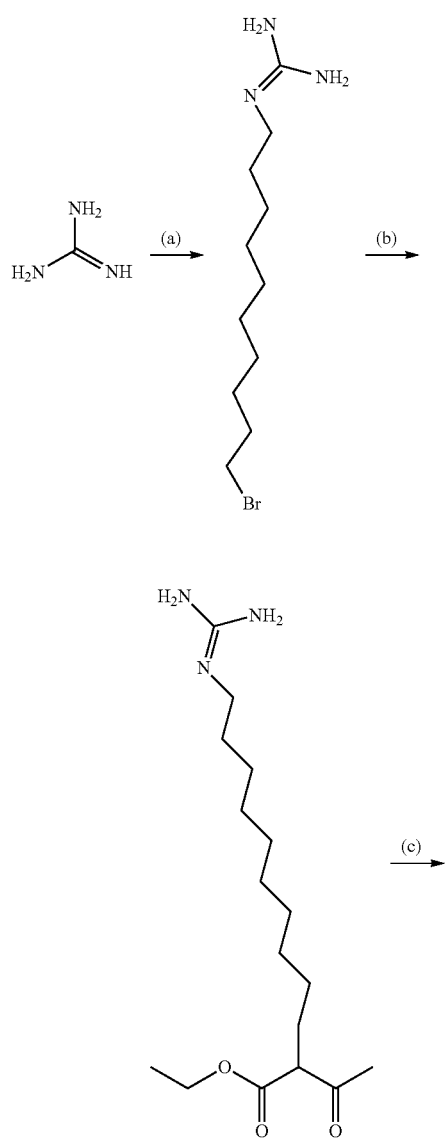

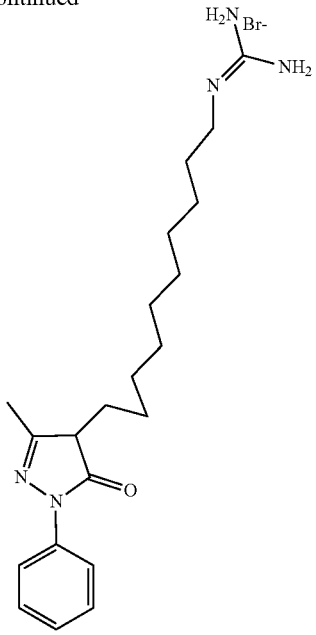

(a) 1,10 dibromodecane, NaOH, NaI, RT; (b) Ethylacetoacetate, NaOEt, EtOH, reflux, 24 h; (c) Phenyl hydrazine, 100-120° C.

Example 9: N,N,N-trimethyl-5-(3-methyl-5-oxo-1-phenyl-4,5-dihydro-1H-2$\lambda^4$-pyrazol-4-yl)pentan-1-aminium bromide (NWD-31)

To a stirred solution of sodium ethoxide in ethanol (21% wt, 25 mmol), ethyl acetoacetate (25 mmol) was added at room temperature. The mixture was heated at 80° C. and after 30 min (5-bromopentyl) trimethylammonium bromide (25 mmol) in Ethanol was added to get a yellow color solution,

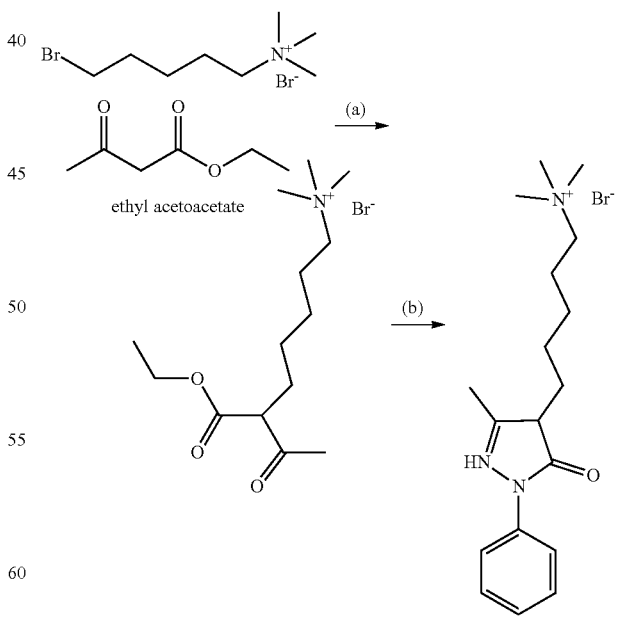

Molecular Weight: 383.3540

(a) NaOEt, EtOH, r.t, then bromobutyl triphenyl posphene in THF, 80° C.;
(b) phenylhydrazine, 140 ° C.

After 30 min at RT reaction mixture turned into white suspension which was then refluxed for 24 h. After 24 h reaction mixture was cooled at RT and EtOH was removed from reaction mass at 55° C. water bath temp. under vacuum. 5 mL H2O was added into reaction mixture to get yellow color solution. Yellow solution was then extracted with 3×10 mL of EA (EA layer become yellow and aq. Layer still remail slightly yellow). All the organic layers were combined and dried over MgSO4. Then evaporated to get yellowish steaky mass. 1.8 mL of Phenyl hydrazine was added into above sticky mass and reacted at 85° C. for 5 h. After workup and column chromatography final compound was collected as yellow crystalline solid (yield 45%). The desired compound was characterized by LC-MS: 302.4 (M/Z).

Example 10: In Vitro Anti-Oxidant Potential Determination of Synthesized Compounds by DPPH Assay NWD-19, NWD-15, and NWD-14 were evaluated for antioxidant activity using the 2,2-diphenyl-1-picrylhydrazyl (DPPH) assay. The DPPH assay was used to predict antioxidant activities by mechanism in which antioxidants act to inhibit lipid oxidation, so scavenging of DPPH radical and therefore determinate free radical scavenging capacity. The DPPH antioxidant assay kit (Dokindo Molecular Technologies, Inc.) was used, and the plates were read at 517 nm on the BioTek Synergy HT plate reader (Gen5 software). All compounds were tested in duplicate at 5 concentrations to determine the anti-oxidant activity of each compound. Dose response curves were generated (as shown in FIG. 1) for all tested compounds and IC50 was determined as 2.1, 2.3 and 2.8 µM for NWD-19, NWD-15, and NWD-14 respectively.

Figure 2:
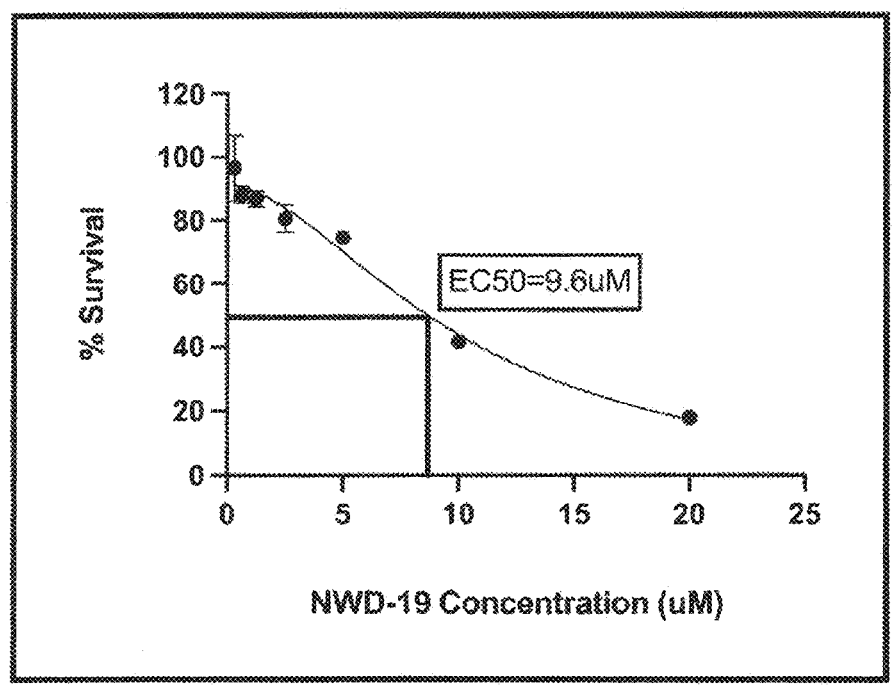
FIG. 2 shows percent survival noted after treatment with various concentrations of NWD-19 on CT-26 cells.

Example 11: In-Vitro Anti-Cancer Activity Evaluation of NWD-19 in CT-26 Cancer Cell Line The CT-26 cell lines were plated at the appropriate pre-determined plating density in the 96 well plate and allowed to attach for about 16 hrs. After a suitable confluence was ensured (about 70-80%) the media was replaced with fresh media and the test compound was added to the plate in triplicate at 6 concentrations. Appropriate vehicle and positive controls were also added, and the plate was incubated overnight in a $CO_2$ (95%)/$O_2$ (5%) incubator at 37° C. temperature. After incubation the plate was assayed for cytotoxicity using cell titer glo 2.0 assay (Promega) on the BioTek Synergy HT plate reader (Gen5 software). Percent survival was calculated at each NWD-19 treatment concentration and an inhibition curve was derived as shown in FIG. 2. EC50 calculated was at 9.6 µM for NWD-19.

Example 12: Protection from AAPH Induced Oxidative Stress to RPE Cell Line by NWD-19

Figure 3:
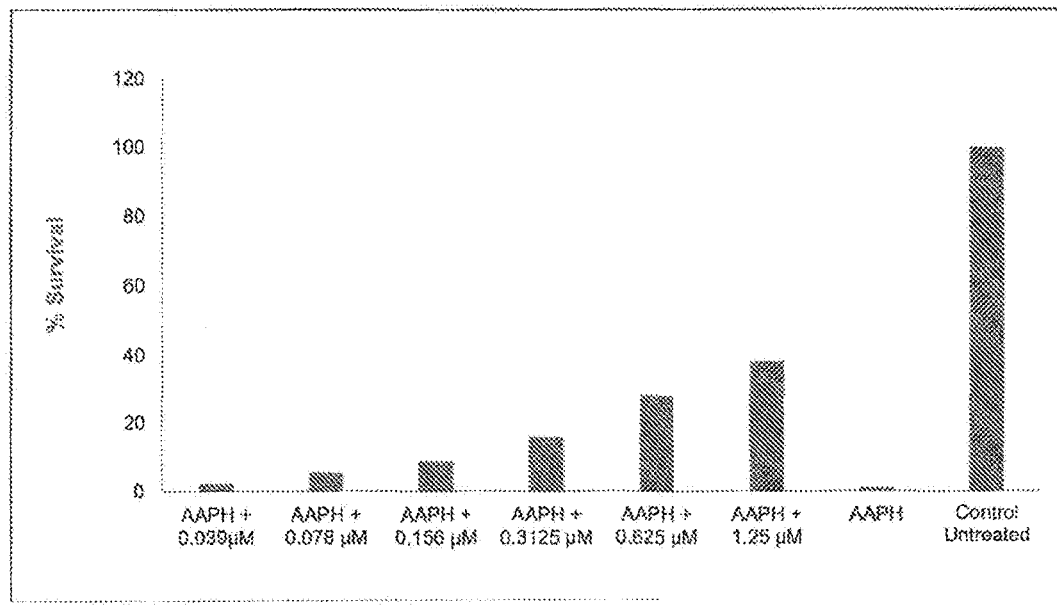
FIG. 3 shows AAPH induced oxidative cell damage in RPE cells and % survival with and without treatment with NWD-19.

Primary retinal pigment endothelial cell line (RPE) were plated in appropriate growth medium in a 96 well plate overnight (16-24 hrs). Once 80-90% confluence was achieved the cells were then treated with NWD-19 at a concentration range of 0.039 uM to 1.25 µM. Appropriate blanks were also added and the plate was incubated overnight in a $CO_2$ (95%)/$O_2$ (5%) incubator at 37° C. temperature. Following incubation all wells were treated with AAPH at 10 mM to induce oxidative stress and incubated overnight. After incubation the plate was assayed for viability using cell titer glo 2.0 assay (Promega). As shown in FIG. 3, AAPH caused oxidative stress induced cell death in almost all RPE cells overnight when compared to the untreated cell. However, treatment with NWD-19 helped reduce the oxidative cell damage and increased survival in a dose dependent manner with 1.25 µM dose demonstrating almost 50% chances of cell survival.

Example 13: In Vitro TBARS Assay in RPE Primary Cells to Evaluate Anti-Oxidant Potential of NWD-19

Figure 4:
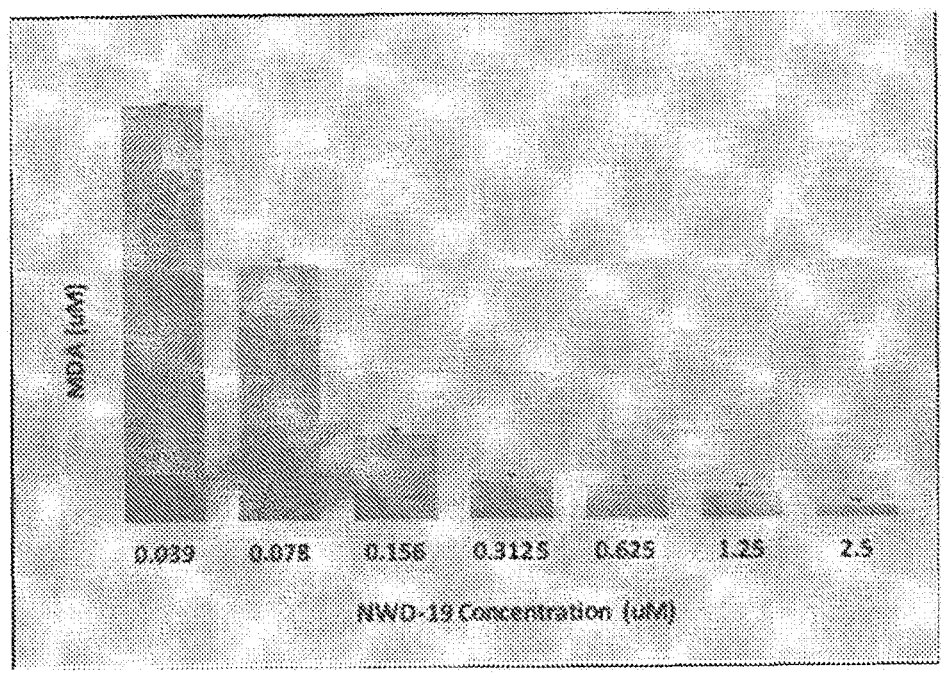
FIG. 4 shows that Malonaldehyde equivalents estimated in RPE cells treated with NWD-19 at various concentrations following the induction of oxidative stress using AAPH.

Primary retinal pigment endothelial cell line (RPE) were plated in appropriate growth medium in a 96 well plate overnight (16-24 hrs). Cells were then treated with NWD-19 at 7 concentrations and incubated overnight. Following incubation all wells were treated with AAPH at 10 mM to induce oxidative stress and incubated overnight. The TBARS assay was then utilized to evaluate the anti-oxidant potential of the compound in the RPE cells at various concentrations. As shown in FIG. 4, NWD-19 showed significant anti-oxidant activity in the TBARS assay on the AAPH induced oxidative stress in the retinal epithelial cell lines up to 0.078 µM concentration.

Example 14: In Vivo Efficacy Evaluation in Benzalkonium Chloride Induced Dry Eyes in C57BL/6 Mice Benzalkonium chloride (BAC) is a commonly used preservative in ophthalmic solutions. However, it has been reported to increase the risk of dry eye disease due to its toxicity on the ocular surface, the conjunctiva, the cornea and even deeper ocular structures. 5 uL 0.2% BAC in mice eyes has been reported to cause dry eye symptoms without affecting aqueous tear production, inflammation, or corneal smoothness (Richard Zhang, et al. Dose-dependent benzalkonium chloride toxicity imparts ocular surface epithelial changes with features of dry eye disease, The Ocular Surface, Volume 18, Issue 1, 2020, Pages 158-169).

Figure 5:
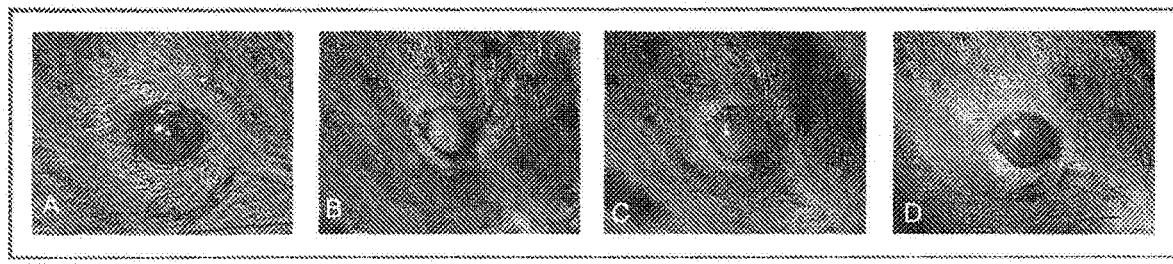
FIG. 5 shows disease progression in the 0.2% BAC treated mouse eye: A) Pre-dose mouse eye; B) Day 7 post BAC dosing; C) Day 14 post BAC dosing (7 days post NWD-19 treatment); and D) Day 21 post BAC dosing (14 days post NWD-19 treatment).

Symptoms of dry eye disease were induced in 24 male and female C57/BL6 mice for 21 days using 0.2% daily eye drops of BAC. Daily topical application of NWD-19 at 10 µM concentration started at day 8 post BAC treatment and continued until day 21, whereas the control mice eyes were treated with PBS during this period. The results of disease progression in the 0.2% BAC treated mouse eye are shown in FIG. 5: A) Pre-dose mouse eye B) Day 7 post BAC dosing C) Day 14 post BAC dosing (7 days post NWD-19 treatment) D) Day 21 post BAC dosing (14 days post NWD-19 treatment). At pre-dose and subsequently on days 7, 14 and 21 post dose the mice eyes were examined by a veterinary ophthalmologist for corneal lesions and dry eye was also evaluated using a drop of 0.1% fluorescein solution in each treated eye and observation and scoring using a cobalt blue filter. BAC (0.2%) caused severe dryness and corneal lesions in the mice eyes by 7 days of treatment. Treatment with NWD-19 drops offered masked improvement in the condition of the eyes as compared to vehicle control eyes as can be seen in FIG. 5.

While specific embodiments of the subject invention have been discussed, the above specification is illustrative and not restrictive. Many variations of the embodiments will become apparent to those skilled in the art upon review of this specification and the claims below. The full scope of the invention should be determined by reference to the claims, along with their full scope of equivalents, and the specification, along with such variations.

I claim:

1. A compound of formula (I), or a pharmaceutically acceptable salt, hydrate, solvate, optical isomer, or combination thereof,

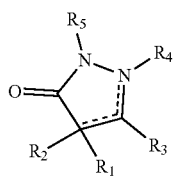

(Formula I)

wherein:
- ⁓⁓⁓ represents single or double bond
- $R_1$ and $R_2$ is selected form the group consisting of —H, —$C_{1-20}$ alkyl, $C_{2-20}$-alkenyl, and $C_{2-20}$-alkynyl, optionally mono-, di- or tri-substituted with halogen, substituted and unsubstituted Aryl, substituted and unsubstituted heteroaryl (mono and bicyclic)
- $R_3$ is selected from the group consisting of —H, —$C_{1-20}$ alkyl, $C_{2-20}$-alkenyl, and $C_{2-20}$-alkynyl, wherein $R_3$ may be substituted by one or more A; aryl and heteroaryl
- $R_4$ is selected from the group consisting of —H, —$C_{1-20}$ alkyl, $C_{2-20}$-alkenyl, and $C_{2-20}$ alkynyl, wherein $R_4$ may be substituted by one or more A;
- $R_5$ is selected from the group consisting of (a) aryl, (b) heteroaryl, (c) —$C_{1-2}$ alkyl-aryl, and (d) —$C_{1-2}$ alkyl-heteroaryl, wherein A is aryl or heteroaryl;

wherein the aryl of choices (a) and (c), and the heteroaryl of choices (b) and (d), are optionally mono-, di- or tri-substituted with substituents selected from the group consisting of halogen, —$C_{1-6}$ alkyl, —$CF_3$, —$OCF_3$, —$C_{1-6}$ alkoxy, —$C_{3-6}$ cycloalkoxy, halo-$C_{1-6}$ alkyl, aryl, heteroaryl, heterocyclo, —$C_{3-6}$ cycloalkyl, and —$C_{3-6}$ cycloalkenyl;

provided at least one out of the $R_1$, $R_2$, $R_3$, $R_4$ and $R_5$ is selected from the group consisting of wherein X, Y, Z are selected from the group consisting of —H, methyl, ethyl, propyl, butyl, substituted or unsubstituted aryl and heteroaryls; n is an integer selected from 0-18 and E is phosphorous or nitrogen atom.

2. The compound according to claim 1, wherein $R_1$, $R_2$, $R_3$ and $R_4$ is —H, —$C_{1-20}$ alkyl, $C_{2-20}$-alkenyl, and $C_{2-20}$-alkynyl.

3. The compound according to claim 1, wherein $R_5$ is aryl, heteroaryl, —$C_{1-2}$ alkyl-aryl, and —$C_{1-2}$ alkyl-heteroaryl.

4. The compound according to claim 1, in which at least one out of the $R_1$, $R_2$, $R_3$, $R_4$ and $R_5$ is selected from the group consisting of formula wherein X, Y, Z are selected from the group consisting of —H, methyl, ethyl, propyl, butyl, substituted or unsubstituted aryl and heteroaryls; n is an integer selected from 0-18 and E is phosphorous or nitrogen atom.

5. The compound according to claim 1, wherein $R_1$, $R_2$ and $R_4$ is H;

$R_3$ is —$CH_3$; and $R_5$ is

provided, at least one out of the $R_2$, $R_3$ and $R_4$ is selected from the group consisting of

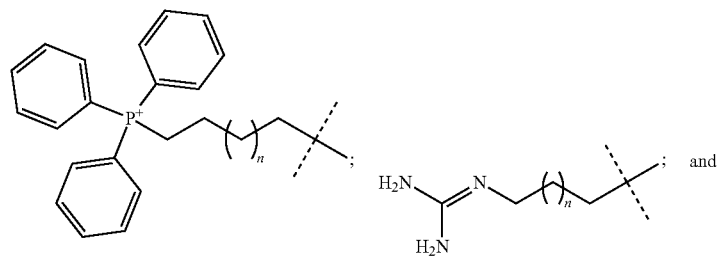

wherein n is an integer selected from 0-18.

6. The compound according to claim 1, wherein
$R_1$, $R_2$ and $R_4$ is H;
$R_3$ is —$CH_3$; and
$R_5$ is

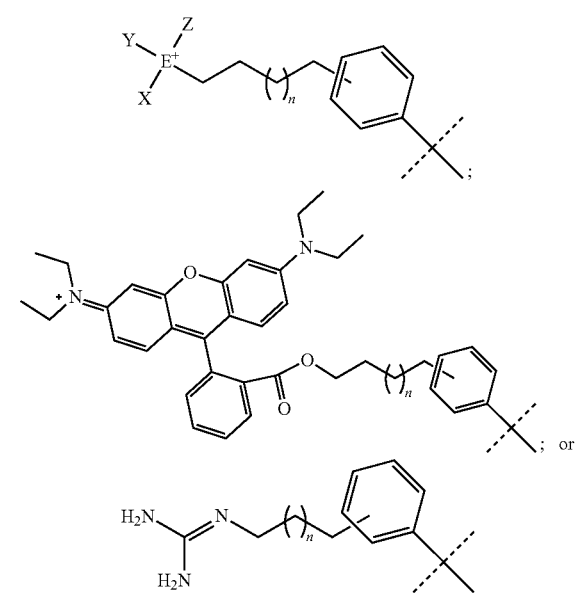

wherein X, Y, Z are selected from the group consisting of —H, methyl, ethyl, propyl, butyl, substituted or unsubstituted aryl and heteroaryls; n is an integer selected from 0-18 and E is phosphorous or nitrogen atom.

7. The compound according to claim 1, wherein the compound of Formula (I) comprises cis, trans, syn, anti, entgegen (E), zusammen (Z) isomers or a mixture thereof.

8. The compound according to claim 1, wherein the compound of Formula (I) comprises one or more asymmetric centres and thus occur as racemates and racemic mixtures, enantiomerically enriched mixtures, single enantiomers, individual diastereomers and diastereomeric mixtures.

9. A pharmaceutical composition comprising a compound according to claim 1 and a pharmaceutically acceptable carrier or diluent.

10. The pharmaceutical composition according to claim 7, wherein the composition is in the dosage form selected form the group consisting of tablet, pill, powder, solution, suspension, emulsion, granule, capsule, suppository and suspension.

11. The compound according to claim 1 for use in treating the human or animal body.

12. A method of treating or preventing conditions involving oxidative stress comprising administering to said patient a therapeutically effective amount of the compound according to claim 1.

13. A method for restoring and/or improving the mitochondrial function, which method comprises administering to said patient a therapeutically effective amount of the compound according to claim 1.

14. A process for preparing the compound of formula (I), or a pharmaceutically acceptable salt thereof,

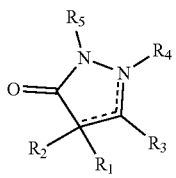

(Formula I)

wherein:
≈≈≈ represents single or double bond
$R_1$ and $R_2$ is selected form the group consisting of —H, —$C_{1-20}$ alkyl, $C_{2-20}$-alkenyl, and $C_{2-20}$-alkynyl, optionally mono-, di- or tri-substituted with halogen, substituted and unsubstituted Aryl, substituted and unsubstituted heteroaryl
$R_3$ is selected from the group consisting of —H, —$C_{1-20}$ alkyl, $C_{2-20}$-alkenyl, and $C_{2-20}$-alkynyl, wherein $R_3$ is substituted by one or more A; aryl and heteroaryl R₄ is selected from the group consisting of —H, —$C_{1-20}$ alkyl, $C_{2-20}$-alkenyl, and $C_{2-20}$ alkynyl, wherein R₄ may be substituted by one or more A;

R₅ is selected from the group consisting of (a) aryl, (b) heteroaryl, (c) —$C_{1-2}$ alkyl-aryl, and (d) —$C_{1-2}$ alkyl-heteroaryl, wherein A is aryl or heteroaryl;

wherein the aryl of choices (a) and (c), and the heteroaryl of choices (b) and (d), are optionally mono-, di- or tri-substituted with substituents selected from the group consisting of halogen, —$C_{1-6}$ alkyl, —$CF_3$, —$OCF_3$, —$C_{1-6}$ alkoxy, —$C_{3-6}$ cycloalkoxy, halo-$C_{1-6}$ alkyl, aryl, heteroaryl, heterocyclo, —$C_{3-6}$ cycloalkyl, and —$C_{3-6}$ cycloalkenyl;

provided at least one out of the $R_1$, $R_2$, $R_3$, $R_4$ and $R_5$ is selected from the group consisting of

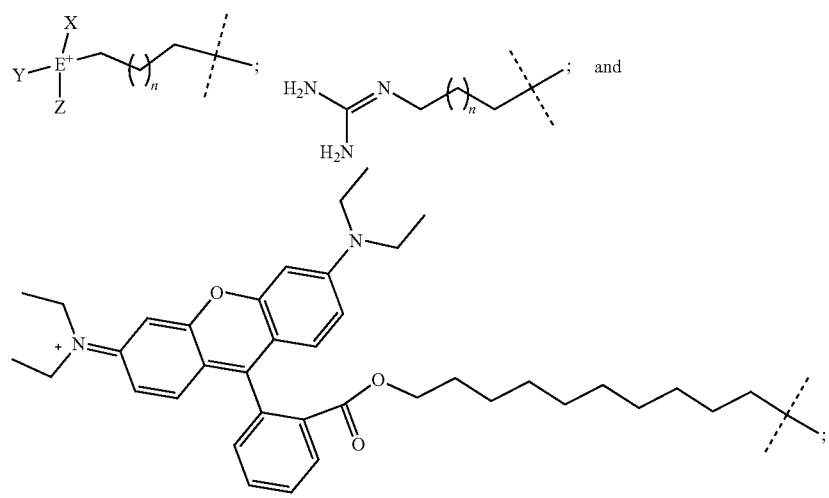

wherein X, Y, Z are selected from the group consisting of —H, methyl, ethyl, propyl, butyl, substituted or unsubstituted aryl and heteroaryls; n is an integer selected from 0-18 and E is phosphorous or nitrogen atom.

15. A method of treating Acute radiation syndrome, Alzheimer's disease, Parkinson's disease, amyotrophic lateral sclerosis (ALS), cancer, cardiovascular diseases associated with reperfusion, neurodegenerative disorders Huntington's Chorea, diabetes and its complications, Friedreich's Ataxia, disease of eye like senile cataract, dry eye disease, age-related macular degeneration, uveitis, dry eyes disease, premature retinopathy, diabetic retinopathy, glaucoma, keratitis, and ocular inflammation, comprising administering to a subject in need thereof a therapeutically effective amount of the compound according to claim 1.

\* \* \* \* \*